US011086040B2

(12) United States Patent
Ulrich, II et al.

(10) Patent No.: US 11,086,040 B2
(45) Date of Patent: Aug. 10, 2021

(54) TIME-REVERSED NONLINEAR ACOUSTICS FOR WELLBORE INTEGRITY CHARACTERIZATION

(71) Applicants: TRIAD NATIONAL SECURITY, LLC, Los Alamos, NM (US); CHEVRON U.S.A. INC., San Ramon, CA (US)

(72) Inventors: Timothy James Ulrich, II, Los Alamos, NM (US); Harvey Edwin Goodman, Houston, TX (US)

(73) Assignees: TRIAD NATIONAL SECURITY, LLC, Los Alamos, NM (US); CHEVRON U.S.A. INC., San Ramon, CA (US)

(*) Notice: Subject to any disclaimer, the term of this patent is extended or adjusted under 35 U.S.C. 154(b) by 0 days.

(21) Appl. No.: 17/031,211

(22) Filed: Sep. 24, 2020

(65) Prior Publication Data
US 2021/0018643 A1 Jan. 21, 2021

Related U.S. Application Data

(63) Continuation-in-part of application No. 16/083,441, filed as application No. PCT/US2017/021606 on Mar. 9, 2017.

(Continued)

(51) Int. Cl.
*G01V 1/46* (2006.01)
*G01V 1/50* (2006.01)
(Continued)

(52) U.S. Cl.
CPC .............. *G01V 1/50* (2013.01); *E21B 47/005* (2020.05); *E21B 47/007* (2020.05); *E21B 49/00* (2013.01);
(Continued)

(58) Field of Classification Search
CPC ..... G01V 1/50; G01V 1/46; G01V 2210/1299; G01V 2210/1429; G01V 2210/642; E21B 47/007; E21B 47/005; E21B 49/00
See application file for complete search history.

(56) References Cited

U.S. PATENT DOCUMENTS 6,269,198 B1   7/2001  Hodgson
6,941,231 B2 *  9/2005  Zeroug .................. G01N 29/07
                                                    702/39

(Continued)

FOREIGN PATENT DOCUMENTS

WO          0231538        4/2002
WO       2013074112        5/2013

OTHER PUBLICATIONS

Blomgren et al., "Super-resolution in time-reversal acoustics" Journal of the Acoustical Society of America 111 (1), Pt. 1, Jan. 2002. (Year: 2002).*

(Continued)

*Primary Examiner* — Krystine E Breier
(74) *Attorney, Agent, or Firm* — Esplin & Associates, PC

(57) ABSTRACT

A pulsed sinusoidal acoustic signal transmitted through a subsurface volume of a wellbore may be detected. A time-reversed acoustic signal of the pulsed sinusoidal acoustic signal may be transmitted through the subsurface volume of the wellbore. Transmission of the time-reversed acoustic signal through the subsurface volume of the wellbore may result in generation of focused acoustic signal in the subsurface volume of the wellbore. The focused acoustic signal in the subsurface volume of the wellbore may be detected, and the integrity of the wellbore may be determined based on the focused acoustic signal in the subsurface volume of the wellbore.

16 Claims, 24 Drawing Sheets

Related U.S. Application Data

(60) Provisional application No. 62/306,037, filed on Mar. 9, 2016, provisional application No. 62/367,337, filed on Jul. 27, 2016.

(51) Int. Cl.
  *E21B 47/005* (2012.01)
  *E21B 47/007* (2012.01)
  *E21B 49/00* (2006.01)

(52) U.S. Cl.
  CPC ........ *G01V 1/46* (2013.01); *G01V 2210/1299* (2013.01); *G01V 2210/1429* (2013.01); *G01V 2210/642* (2013.01)

(56) References Cited

U.S. PATENT DOCUMENTS

| | | | |
|---|---|---|---|
| 7,274,992 B2 | 9/2007 | Dewhurst | |
| 7,639,563 B2 * | 12/2009 | Wu | E21B 47/005 367/35 |
| 7,753,118 B2 * | 7/2010 | Ramakrishnan | E21B 47/005 166/250.02 |
| 8,553,495 B2 * | 10/2013 | Johnson | G01V 1/46 367/35 |
| 8,576,661 B2 * | 11/2013 | Johnson | G01V 1/46 367/35 |
| 9,103,196 B2 * | 8/2015 | Zhao | G01V 1/44 |
| 9,103,928 B2 * | 8/2015 | Gao | G01V 3/12 |
| 9,322,808 B2 | 4/2016 | Vouagner | |
| 10,012,749 B2 * | 7/2018 | Bose | E21B 47/005 |
| 10,197,549 B2 | 2/2019 | Thomas | |
| 10,408,053 B2 * | 9/2019 | Breaux | G01V 1/44 |
| 10,605,954 B2 * | 3/2020 | Hu | E21B 47/005 |
| 2007/0056771 A1 | 3/2007 | Gopalan | |
| 2012/0075951 A1 | 3/2012 | Johnson | |
| 2012/0116682 A1 | 5/2012 | Saenger | |
| 2012/0123684 A1 | 5/2012 | Vu | |
| 2013/0116926 A1 | 5/2013 | Rodney | |
| 2019/0101660 A1 | 4/2019 | Johnson | |

OTHER PUBLICATIONS

International Application No. PCT/US2017/021606, International Search Report and Written Opinion dated Jun. 1, 2017 (2 pages).

\* cited by examiner

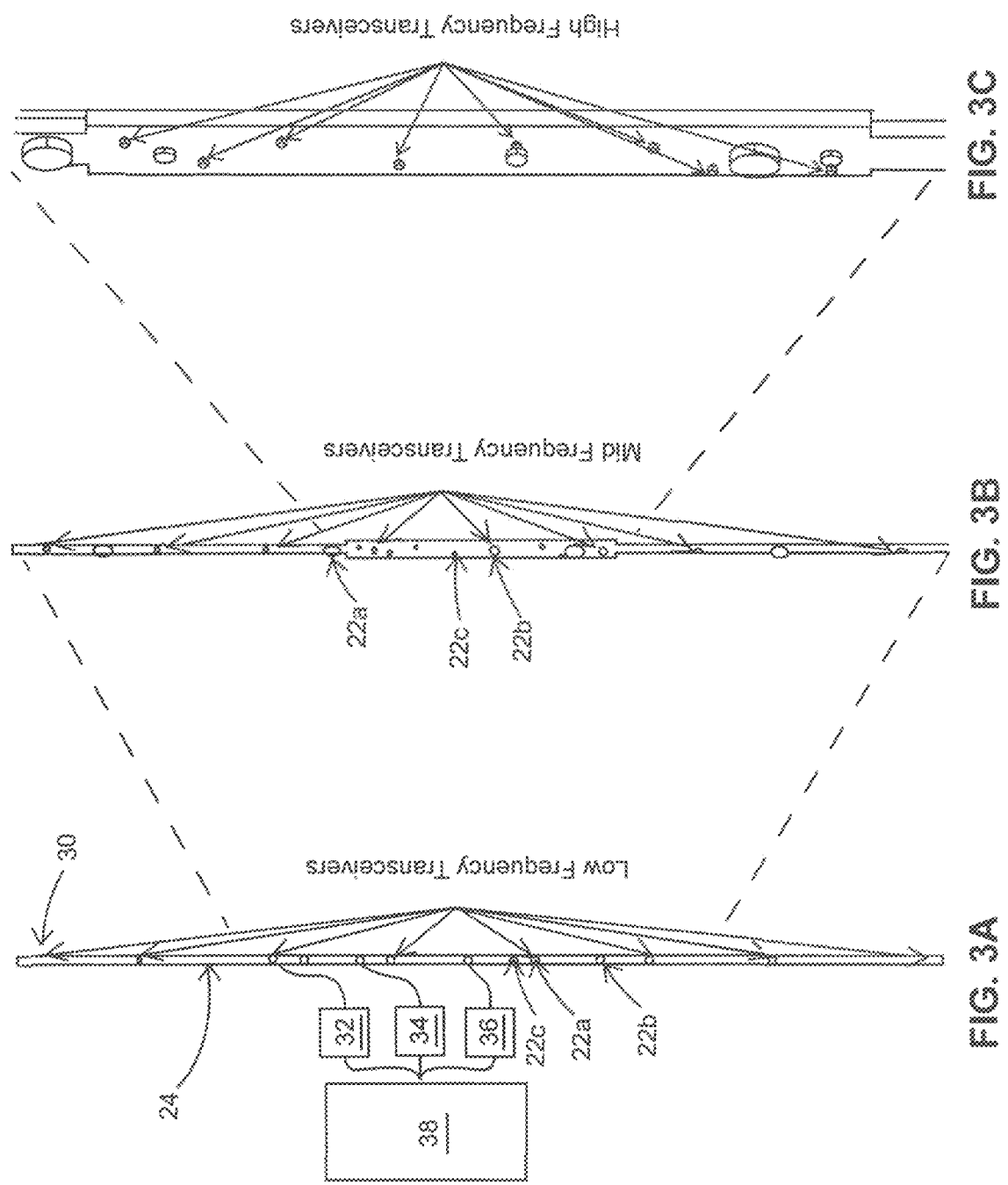

TIME-REVERSED NONLINEAR ACOUSTICS FOR WELLBORE INTEGRITY CHARACTERIZATION

CROSS-REFERENCE TO RELATED APPLICATIONS

The present application is a continuation-in-part of U.S. patent application Ser. No. 16/083,441, filed on Sep. 7, 2018, which is a national stage application of International Application No. PCT/US2017/021606, filed 9 Mar. 2017, which claims the benefit of U.S. Provisional Patent Application No. 62/306,037 for "Time-Reversed Nonlinear Acoustics For Downhole Pressure Measurements" by Paul A. Johnson et al., which was filed on 9 Mar. 2016, and of U.S. Provisional Patent Application No. 62/367,337 for "Time-Reversed Nonlinear Acoustics For Downhole Pressure Measurements" by Paul A. Johnson et al., which was filed on 27 Jul. 2016, the entire contents of which Patent Applications are hereby specifically incorporated by reference herein for all that they disclose and teach.

STATEMENT REGARDING FEDERAL RIGHTS

The United States government has certain rights in this invention pursuant to Contract No. 89233218CAN000001 between the United States Department of Energy and TRIAD National Security, LLC for the operation of Los Alamos National Laboratory.

PARTIES TO JOINT RESEARCH AGREEMENT

The research work described here was performed under a Cooperative Research and Development Agreement (CRADA) between Los Alamos National Laboratory (LANL) and Chevron under the LANL-Chevron Alliance, CRADA number LA05C10518.

BACKGROUND OF THE INVENTION

Sedimentary rocks and man-made materials like concrete may be described as a network of mesoscopic-sized "hard" elements (e.g., grains with characteristic lengths ranging from tens to hundreds of microns) embedded in a "soft" bond system (e.g., cement between grains, pore space, fluid). Such systems belong to a wider class of materials referred to as Nonlinear Mesoscopic Elastic Materials (NMEMs). The microscopic-sized imperfections at the interfaces between "hard" and "soft" subsystems are believed to be responsible for a number of interesting properties related to nonlinear and nonequilibrium dynamics, including the dependence of elastic parameters and attenuation on strain amplitude, slow dynamics, and hysteresis with end-point memory. Understanding and predicting these properties is basic for numerous applications including oil exploration.

When high pressure zones are breached during drilling operations the hydrocarbon fluids travel up the well at a high rate, and drilling and/or extraction processes can be hampered and/or disrupted.

Knowledge of pore pressure in a formation is valuable for planning drilling operations and for geochemical and geological analyses. Pore pressures are the fluid pressures in the pore spaces in the porous formations. The pore pressure gradient is used in drilling for determining mud weight, which is selected based on pore pressure gradient, wellbore stability and fracture gradient prior to setting and cementing a casing. The drilling fluid is applied in the form of mud pressure to support the wellbore walls for preventing influx and wellbore collapse during drilling.

SUMMARY OF THE INVENTION

To achieve the purposes of embodiments of the present invention, as embodied and broadly described herein, the method for measuring pore pressure in a formation, hereof, includes: generating a pulsed sinusoidal acoustic signal having a chosen frequency from a first transceiver disposed in a borehole in the formation; receiving the acoustic signal on at least one second transceiver disposed in the borehole; time reversing the received signal; transmitting the time-reversed signals from the at least one second transceiver, whereby the time-reversed acoustic signals form a focal volume centered on the first transceiver; receiving second and third harmonics of the chosen frequency generated in the focal volume on the first transceiver, the harmonic signals having an amplitude; and monitoring the amplitude of the received harmonic signals.

In another aspect of embodiments of the present invention and in accordance with its purposes the apparatus for measuring pore pressure in a formation, hereof, includes: a first signal generator for generating a pulsed sinusoidal signal having a chosen frequency; a first transceiver disposed in a borehole in the formation for receiving the signal from the first signal generator, and transmitting an acoustic signal; at least one second transceiver disposed in the borehole for receiving the transmitted acoustic signal and generating a first electrical signal therefrom; a processor for receiving the first electrical signal and time reversing the received signal; at least one second signal generator for receiving the time-reversed electrical signal, generating a second acoustic signal therefrom, and directing the second acoustic signal onto the at least one second transceiver, such that the second acoustic signal is transmitted; whereby the time-reversed acoustic signal forms a focal volume centered on the first transceiver, second and third harmonics of the chosen frequency are generated in the formation and received by said first transceiver, producing a second electrical signal having an amplitude, and the amplitude of the second electrical signal is monitored by the processor.

In yet another aspect of embodiments of the present invention and in accordance with its purposes the method for measuring pore pressure in a formation through a borehole having a metal casing, hereof, includes: generating a pulsed sinusoidal acoustic signal having a chosen frequency from a first transceiver disposed in the borehole; receiving acoustic signals on at least one second transceiver disposed in the borehole above the first transceiver; time reversing the received signals; transmitting the time-reversed signals with a selected intensity, whereby the time-reversed acoustic signals form a focal volume centered on the first transceiver; receiving second harmonics of the chosen frequency generated in the formation, on the first transceiver, the second harmonic signals having an amplitude; monitoring the amplitude of the received harmonic signals, whereby β is determined; receiving a second acoustic signal responsive to vibrational excitation in the focal volume on a third transceiver disposed in vibrational communication with the metal casing; varying the intensity of the transmitted time-reversed acoustic signal; and measuring the time delay of the second acoustic signal relative to the time-reversed acoustic signal as a function of the intensity of the transmitted time-reversed acoustic signals; whereby a is determined.

In still another aspect of embodiments of the present invention and in accordance with its purposes the apparatus for measuring pore pressure in a formation through a borehole having a metal casing, hereof, includes: a first signal generator for providing a pulsed sinusoidal signal having a chosen frequency; a first transceiver disposed in the borehole in the formation for receiving the pulsed sinusoidal signal from the first signal generator, and transmitting an acoustic signal; at least one second transceiver disposed in the borehole for receiving the transmitted acoustic signal and generating a first electrical signal therefrom; a first processor for receiving the first electrical signal and time reversing the received electrical signal; at least one second signal generator for receiving the time-reversed electrical signal, generating a second electrical signal therefrom, and directing the second electrical signal onto the at least one second transceiver, such that a second acoustic signal having a selected intensity is transmitted; whereby the time-reversed acoustic signals form a focal volume centered on the first transceiver, the first receiver receiving second harmonics of the chosen frequency generated in the formation, the harmonic signals having an amplitude; a second processor for monitoring the amplitude of the received harmonic signals, whereby β is determined; a third transceiver disposed in the borehole in vibrational communication with the metal casing for measuring the time delay of the second acoustic signal relative to the time-reversed acoustic signal as a function of the selected intensity of the transmitted time-reversed acoustic signal; whereby a is determined.

Benefits and advantages of embodiments of the present invention include, but are not limited to, providing an apparatus and method for determining the existence of and the distance to a down hole over-pressured region in advance of a drilling bit, using a combination of time reversal and elastic nonlinearity.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIG. 2A is a schematic representation of an embodiment of the present apparatus for practicing look-ahead drilling based on Time Reversal Nonlinear Elastic Wave Spectroscopy, illustrating an acoustical source located above, and in the vicinity of a drill bit transmitting an acoustic wave that is swept in frequency as a function of time, the signals propagating both into the well bore and into the surrounding formation, and received and recorded by transceivers disposed in the wellbore on a transceiver mount disposed near the drilling apparatus, while

FIG. 3A is a schematic representation of an embodiment of the transceiver mount illustrated in FIGS. 2A and 2B showing a possible arrangement for the low-frequency transceivers, and FIGS. 3B and 3C show a possible arrangement for the mid-frequency and high-frequency transceivers, respectively, while

FIG. 4A illustrates the forward or calibration steps to achieve the classical time reversed process using the apparatus of FIGS. 1A and 2B, and 3, while

FIG. 7C is a graph of the detected focused pulse propagation down the pipe from a single transducer using classical time reversal, while

FIG. 8A is a graph of the delay in the arrival time of a detected pulse in the pipe of the apparatus of FIG. 6 as the amplitude of the signal pulse increases from (a) to (c), while

FIG. 11A is a graph of the time dependence of the particle velocity, while

FIG. 12A is a graph of the relative change in elasticity as a function of strain estimated from the propagation of a pulse centered at 22.4 kHz and measured 500 mm from the source at 20 source amplitudes, while

DETAILED DESCRIPTION OF THE INVENTION

Figure 1A:
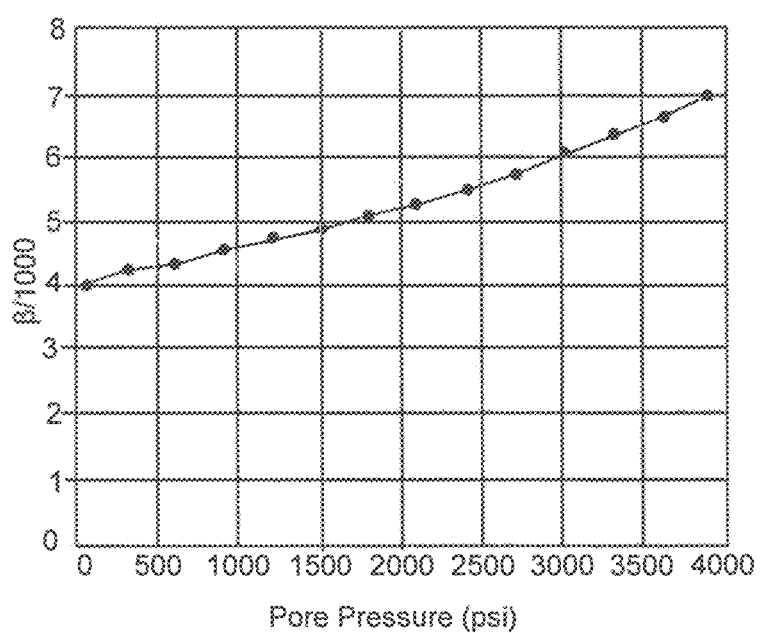
FIGS. 1A and 1B provide graphs of the nonlinear parameters β and aα, respectively, as a function of pore pressure.

As a result of the need for accurate pore pressure prediction for drilling operators to reduce borehole trouble time and avoid drilling incidents, oil companies and oil service companies have been seeking methods for detecting high pressures ahead drilling bits as they penetrate the earth, such that corrective action can be taken before the region is breached.

Overpressure rock has a signature elastic response that can be detected by combining Time Reversal techniques with Elastic Nonlinearity in a technique which is known as Time Reversal Nonlinear Elastic Wave Spectroscopy (TR NEWS). The nonlinear elastic wave response is directly related to the effective pressure (hydrostatic load minus the pore pressure). Time reversal is a method for focusing acoustic waves such that large wave amplitudes are obtained in a localized region of space. As a result of the large acoustic wave amplitudes at the focus and the nonlinearity of the material, harmonics may be generated (and sum and difference frequencies if two waves are present). These harmonic frequencies are detected at the focus and, as will be discussed in more detail below, changes in the amplitude of the detected harmonics indicate that high pressure may be present.

Nonlinear materials exhibit a nonlinear stress-strain relation which can be probed by acoustic waves, leading to pressure-specific acoustic signatures. Harmonics of the incident acoustic frequencies are created when the acoustic waves are focused. The effective pressure in a formation may be written as, $$P_{eff} = \sigma - bP \tag{1}$$

where $\sigma$ is the confining pressure, P is the pore pressure, and b is the Biot coefficient (typically 0.4-0.9 in rock). The effective pressure can also be described by a nonlinear stress-strain relationship, $$P_{eff} = K[1 - \beta\varepsilon - \delta\varepsilon^2]\varepsilon + K\frac{\alpha}{2}[((\Delta\varepsilon)^2 - \varepsilon^2)\operatorname{sign}(\dot{\varepsilon}) - 2(\Delta\varepsilon)\varepsilon] \tag{2}$$

where K is the linear stiffness constant, $\varepsilon$ is the strain, $\Delta\varepsilon$ is the strain amplitude, $\dot{\varepsilon}$ denotes the partial derivative with respect to time, sign is a function returning the sign (positive or negative) of the argument, $\beta$ and $\delta$ are combinations of third- and fourth-order elastic constants representing the acoustoelasticity (quadratic and cubic classical nonlinearity), and the parameter $\alpha$ relates to the strength of the hysteresis, according to the Preisach-Mayergoyz model of elasticity. See, e.g., K. R. McCall et al., "A new theoretical paradigm to describe hysteresis, discrete memory and nonlinear elastic wave propagation in rock," *Nonlin. Proc. Geophys.* 3, 89-101 (1996), R. A. Guyer et al., "Quantitative implementation of Preisach-Mayergoyz space to find static and dynamic elastic moduli in rock," *J. Geophys. Res.* 102(B3), 5281-5293 (1997), and G. Douglas Meegan, Jr. et al., "Observations of Nonlinear Elastic Wave Behavior in Sandstone," J. Acoust. Soc. Am. 94, (1993) 3387-3391. Combining Eqs. (1) and (2) leads to an expression of the pore pressure as a function of confining pressure and nonlinear elastic parameters of the material, $$P = \frac{1}{b}(\sigma - K[1 - \beta\varepsilon - \delta\varepsilon^2]\varepsilon + K\frac{\alpha}{2}[((\Delta\varepsilon)^2 - \varepsilon^2)\operatorname{sign}(\dot{\varepsilon}) - 2(\Delta\varepsilon)\varepsilon]). \tag{3}$$

The parameters $\alpha$, $\beta$, and $\delta$ may be obtained from the time reversal signal, with $\alpha$ being obtained from the velocity change of the focused signal as a function of strain amplitude. The velocity change may be also measured using cross correlation or another standard technique on a low amplitude (linear) wave at the time reversal focus, and the progressive delays caused by using progressively larger amplitude excitation waves. Cross correlation is a commonly applied method for measuring time delays between a reference signal and a signal that has experienced a velocity change. $\beta$ is obtained from the amplitude dependence of the second harmonic of a pulsed pure sinusoid or the amplitude dependence of sum ($\omega_1+\omega_2$) and difference ($\omega_1-\omega_2$) frequencies if two waves are employed. See, also, TenCate, J. A. et al. (1996) "Laboratory Study of Linear and Nonlinear Elastic Pulse Propagation in Sandstone," J. Acoust. Soc. Am. 100 (3), 1383-1391. $\delta$ is obtained from the amplitude dependence of the third harmonic of the fundamental drive amplitude at small, but still nonlinear amplitudes and, in general, can be ignored. At larger amplitudes, however, a dominates and $\delta$ becomes overwhelmed and can be ignored.

$\alpha$ is given by:

$$\alpha = \frac{\Delta C}{C_0}\frac{1}{\varepsilon} \tag{4}$$

$$\varepsilon = \frac{\ddot{u}}{2\pi f C_0},$$

where $C_0$ is the linear velocity and C the perturbed velocity. The second derivative of u with respect to t is the particle acceleration measured in the frequency domain, f is the wave fundamental frequency, and $\varepsilon$ is the strain measured at frequency f in the focal region as the signal source amplitude is increased. By plotting the change in wave speed as a function of strain, alpha can be obtained.

Alternatively, alpha can be obtained from the third harmonic amplitude also when wave amplitudes are large. In the following alpha, beta and delta are shown.

$$\alpha = \frac{c_0^2}{L}\frac{\ddot{u}_{3f}}{\ddot{u}_{1f}^2} \tag{5}$$

$$\beta = \frac{c_0^2}{L}\frac{\ddot{u}_{2f}}{\ddot{u}_{1f}^2}$$

$$\delta = \frac{\omega c_0^3}{L}\frac{\ddot{u}_{3f}}{\ddot{u}_{1f}^3}$$

where L is the wavelength of the fundamental frequency divided by two, equivalent to the radius of the focal region, the second derivative of u with respect to time, 3f, is the third harmonic acceleration amplitude, the second derivative of u with respect to time, 2f, is the second harmonic acceleration amplitude, the second derivative of u with respect to time, 1f, is the fundamental harmonic acceleration amplitude, and $\omega=2\pi f$, where f is the fundamental frequency.

Figure 1B:
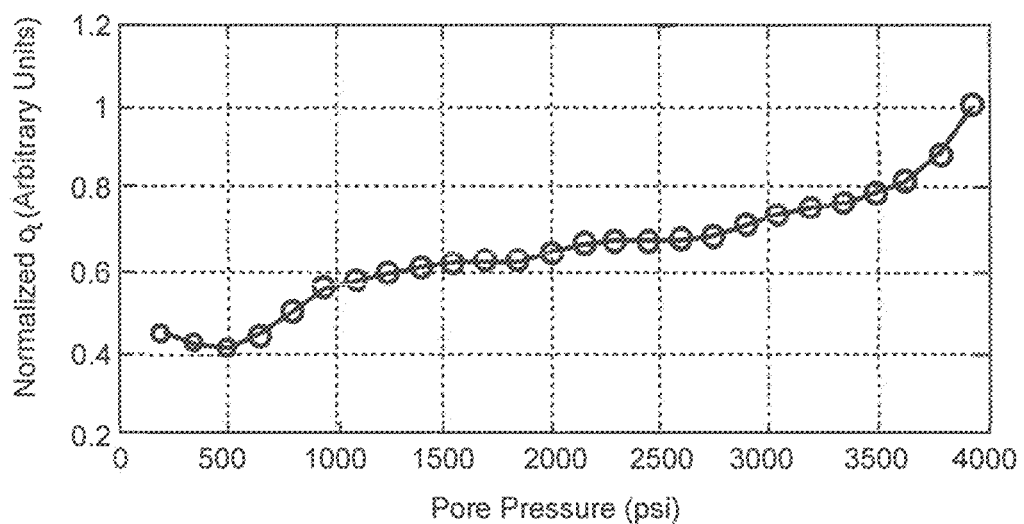

FIG. 1A is a graph of $\beta$ as a function of pore pressure, while FIG. 1B is a graph of $\alpha$ as a function of pore pressure.

Time reversal permits the generation of focused, intense (non-damaging) sound in a region to induce local nonlinearities if high pressure is present, by taking advantage of the above relation for $u_{2f}$, thereby permitting detection and imaging of overpressure regions. As an example, waves may be introduced into a specimen using a piezoelectric transducer. The waves are recorded on another transducer located elsewhere on the sample surface. The recorded waves are then reversed in time, and emitted from the detecting transducers, where they follow their forward wave paths backwards-in-space, and coalesce, focusing at the original source transducer, since the elastic wave equation is symmetric with respect to time. That is, the wave equation may be evaluated either forward or backward in time, the physics being identical. Amplitudes at the time-reversed focus are large due to conservation of energy, since all of the energy contained in the long-duration scattered-signal is collapsed onto the focal point in space and time. Since wave amplitudes are largest at the focus, the local response may be nonlinear, but only at the focus.

Further, by measuring $\alpha$ and $\beta$ for a formation using time reversal techniques, one can obtain accurate values for the pore pressure in a formation, using Equations 2 and 3, above. Among the uses for the gradient of the pore pressure are the prediction of gas/water contacts, which permit more accurate location of hydrocarbons in the formation.

Figure 2A:
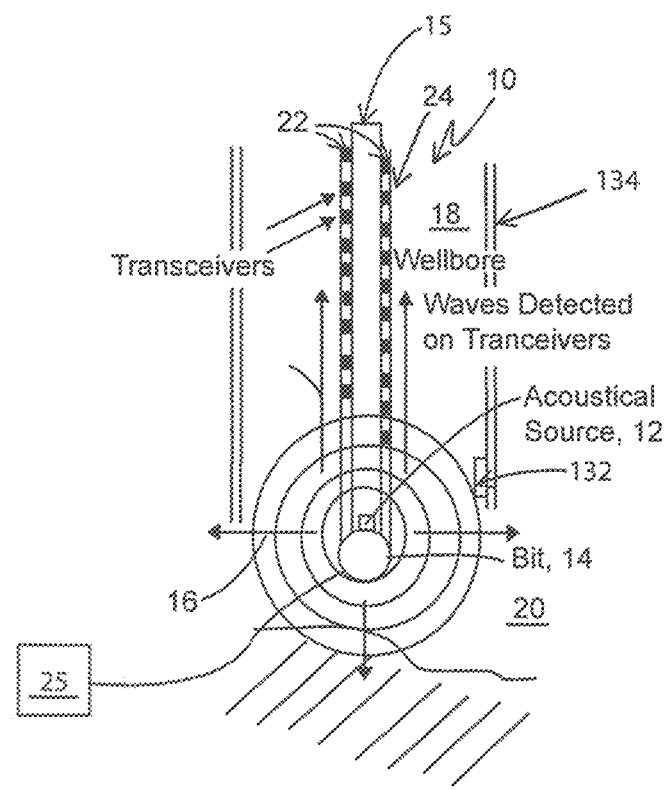
Figure 2B:
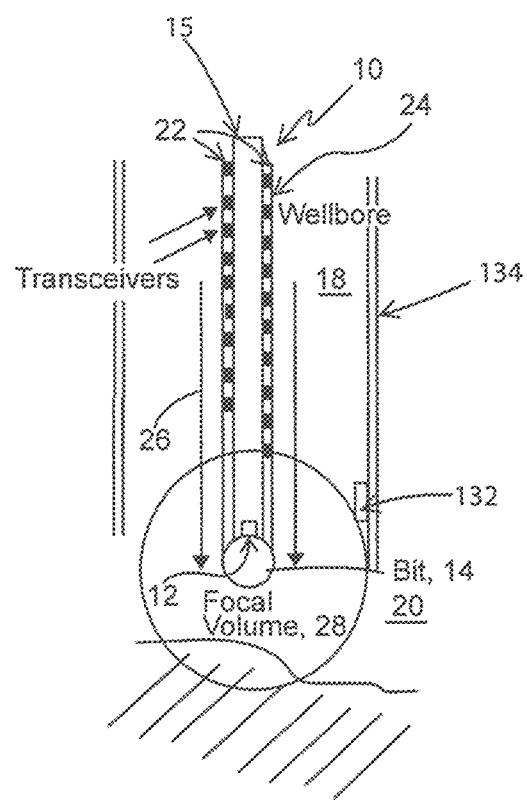
FIG. 2B illustrates the signals detected by the transceivers being digitally reversed-in-time by microprocessors located at the transceivers or at the surface, amplified, and rebroadcast into the bore hole and into the surrounding formation, and focusing the space distribution of elastic wave energy in the region of the original acoustic source.

Reference will now be made in detail to the present embodiments of the invention, examples of which are illustrated in the accompanying drawings. In the FIGURES, similar structure will be identified using identical reference characters. Turning now to FIG. 2A, a schematic representation of an embodiment of the present apparatus, 10, for practicing look-ahead drilling based on TR NEWS is illustrated. Acoustical source, 12, located above, and in the vicinity of drilling bit, 14, turned by shaft, 15, transmits a sine wave that is swept in frequency as a function of time. Other signal types may be employed, including pulsed signals. Signals, 16, propagate both into well bore, 18, and into formation, 20, surrounding the borehole, and are received and recorded by transceivers, 22, also disposed in the wellbore on transceiver mount, 24, disposed near the drilling apparatus. One end of transceiver mount 24 may be placed between just behind drilling bit 14 and 10-20 m therefrom. Apparatus, 25, is employed to change the direction of drilling bit 14 in response to pore pressure measurements in accordance with embodiments of the present invention. As shown in FIG. 2B, the detected signals are digitally reversed-in-time, by microprocessors located at detectors (transceivers) 22 or at the surface, amplified (not shown in FIGS. 2A and 2B), and rebroadcast, 26, into the bore hole and into the surrounding formation. In accordance with the time-reversal process, the signals follow their forward propagation directions in reverse, and focus at source 12 that also acts as a detector. The phase relationships among the returning waves permit the constructive interference thereof resulting in space and time focusing. The focused signal is large in amplitude and is effective for inducing an elastic nonlinear response in focal volume, 28. If a portion of focal volume 28 encompasses a high fluid or gas pressured region, the nonlinear response of generated harmonic frequencies (and potentially sum and difference frequencies), and time delays due to wave speed decreases, will be significantly greater than at an established baseline thereof. This nonlinear response is detected and interpreted at the surface or by microprocessors located behind the drilling string (not shown in FIGS. 2A and 2B). By varying the frequency of the swept sine signal, the distance to the over-pressured region can be estimated from the frequency, if the sound velocity in formation 20 is known (as is generally the situation) using the relationship for the wavelength, $\lambda$=velocity/frequency. The diameter of the focal spot measured at the half maximum value is equal to one-half of the dominant wavelength. See, e.g., "Depth Profile of A Time-Reversal Focus in An Elastic Solid," by Marcel C. Remillieux et al., Ultrasonics 58 (2015) 60-66. Corrective action can then be taken by the drillers (placing blow-out stops etc.).

A schematic representation of an embodiment of transceiver mount 24 is shown in FIGS. 3A-3C. FIG. 3A shows a possible arrangement for low-frequency transceivers, 22$a$, while FIGS. 3B and 3C show an arrangement for mid-frequency, 22$b$, and high-frequency transceivers, 22$c$, respectively. The transducer mount includes a long metallic portion, 30, adapted to fit in a cased borehole having an inner diameter of 6 in. Transducer mount 24 may also be constructed of sturdy plastics capable of withstanding high temperatures and caustic environments. Advantageously, the long dimension of mount 24 is equal to or larger than five times the largest wavelength of the elastic waves propagating in the formation. If mount 24 is made of steel (Young modulus E=200 GPa and mass density $\rho$=8500 kg/m$^3$), and is operated at a center frequency $f_c$=2 kHz, then the elastic wavelength is $\lambda$~$\sqrt{(E/\rho)}/f_c$=2.6 m, and the minimum length of the mount would be about 12 m. The actual shape of the mount can be optimized to improve the transfer of energy from the tool to the formation.

Figure 3D:
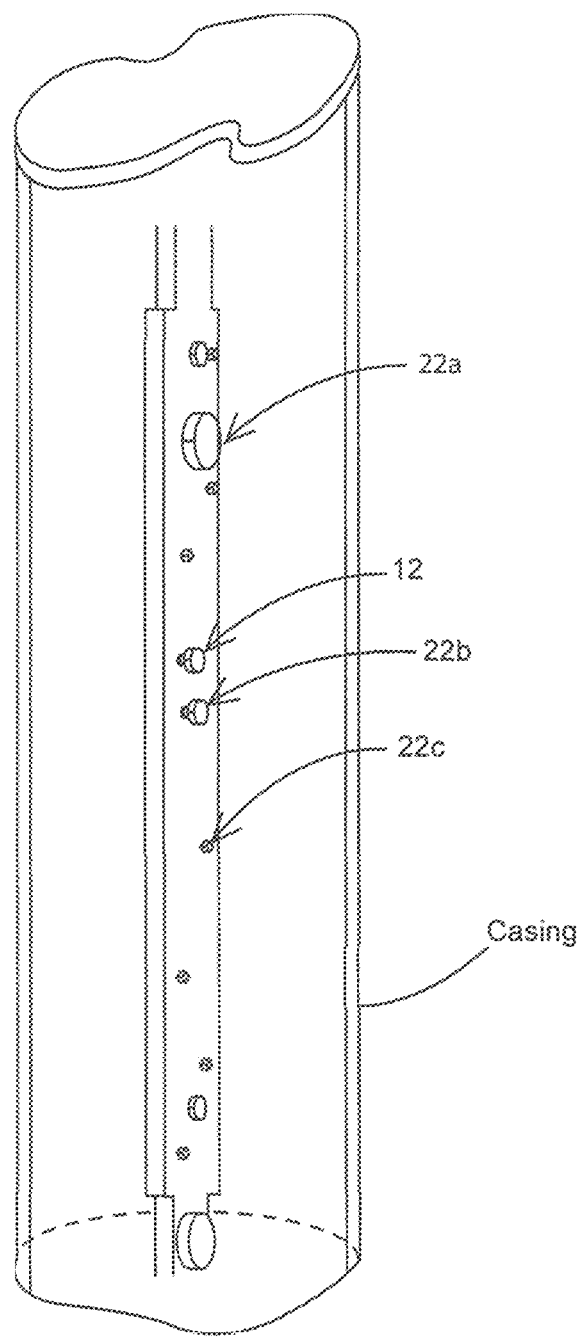
FIG. 3D illustrates a transceiver mount having a transceiver at the focus of the other transceivers for use in completed holes.

FIG. 3D is a schematic representation of another embodiment of transceiver mount 24 where transceiver 12 is located approximately in the center of the mount. This design is suitable for measuring pore pressure in formations through well casings.

Independently controlled low-frequency transceivers 22$a$ mid-frequency transceivers 22$b$ and high-frequency transceivers 22$c$ controlled by digital synthesizers, 32, 34, and 36, respectively, which are directed by microcontroller and digital signal processor, 38, are affixed along mount 24 to provide the required excitation signals. Transducers vary in size and relative spacing depending on the center frequency of excitation signal that is intended to be generated. For low frequency excitation, large transducers are distributed over the entire length of the tool. For high frequency excitation, smaller transducers are centered with a smaller span around the point where focus should be achieved (at transceiver 12).

Source 12 generates a swept sine wave that encompasses frequencies $f_{i\ldots l}$ that provide the spatial resolution $\lambda_{i\ldots l}$ of interest in a given group of strata. For example, given a typical formation velocity c of 2000 m/s, and a desired probe distance of l=10 m in advance of the drill bit, the time-reversed focal diameter would be d=20 m, and the center frequency would therefore be $f_j$=100 Hz. Using a swept sine wave $f_{i\ldots l}$, spatial wavelengths above and below this value may be probed. The spatial wavelength may be reduced by increasing the frequency until the large nonlinear response disappears. In this manner the distance to the over-pressured region can be determined.

Figure 4A:
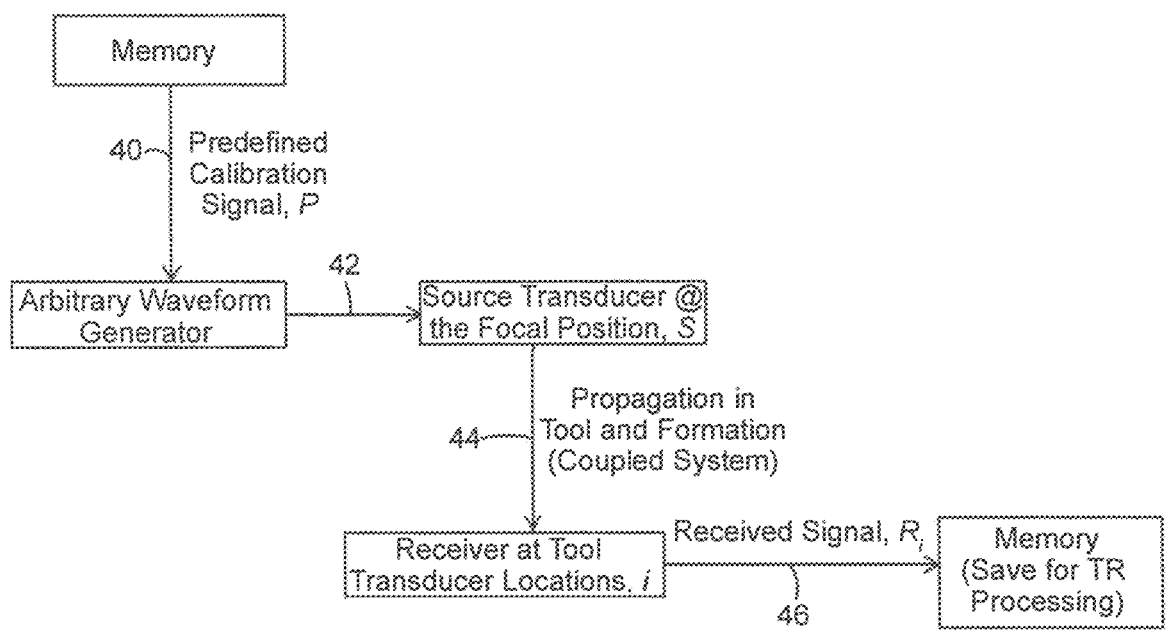
Figure 4B:
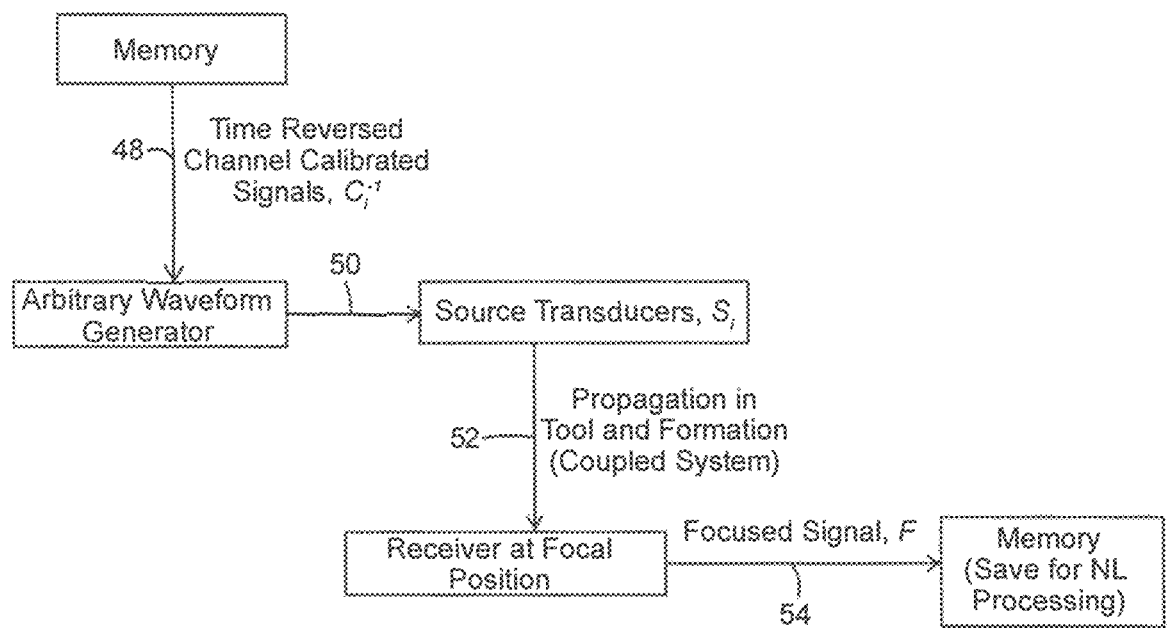
FIG. 4B illustrates reverse or focusing steps for the time reversed process.

FIG. 4A illustrates the forward or calibration steps to achieve the classical time reversed process using the apparatus of FIGS. 2A and 2B, and 3, while FIG. 4B illustrates that reverse or focusing steps for the time reversed process. In Step 40, of FIG. 4A, a predetermined calibration signal, P, from memory storage is directed to an arbitrary waveform generator, which drives, Step 42, source transducer 12 at the focal position, S. Signals generated from source transducer 12 are received by all of the transceivers 22, Step 44, and stored in memory, Step 46. Step 48 in FIG. 4B simultaneously directs the time reversed signals stored in memory in step 46 to an arbitrary waveform generator which drives transceivers 22, Step 50, the transmitted signals being focused onto transducer 12 in Step 52. Nonlinear signals, F, generated, Step 54, in the focal area are stored in memory for later processing. This calibration process would be undertaken every time measurements of $\alpha$ and $\beta$ are to be made, since external conditions, such as increasing pressures of drilling mud, may change the calibration.

Noise from impulsive elastic waves generated from the action of drilling bit 14 on the materials in a formation can be used as a source for the classical time reversal measurements in place of acoustic source 12 in accordance with embodiments of the present invention. In this situation, the drilling bit would be stopped when the amplified time-reversed signals generated by transceivers 22 are employed to generate harmonics in front of drilling bit 14, the harmonic signals being correlated with the time-reversed signals from the drilling bit.

Figure 5:
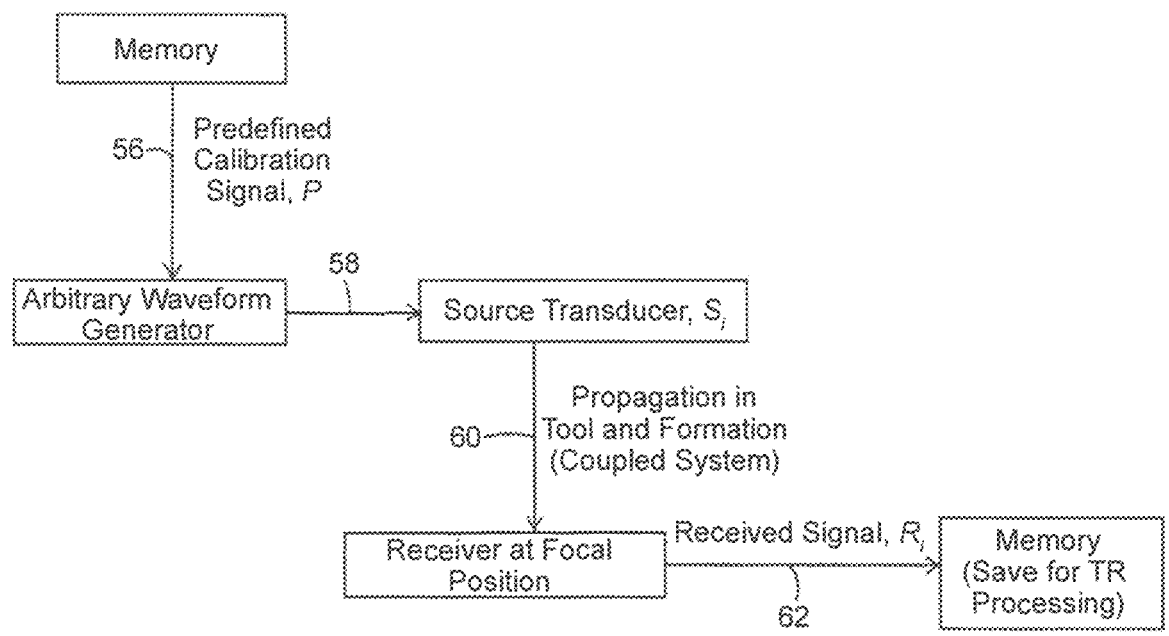
FIG. 5 illustrates the 'training' process for reciprocal time reversal, where a predefined calibration signal is sequentially imposed on transceivers, received by a transceiver at the focal position, and stored for use for time reversal processing once the stored signals are time reversed.

The method described in FIG. 4 is based on 'classical' time reversal. As will now be described, 'reciprocal' time reversal can also be applied. Here, transceivers 22 located on transceiver mount 24 are caused to individually broadcast a signal for a 'training' step. Transceiver 12 detects these signals that are broadcast one at a time. The detected signals are time reversed, and amplified and reemitted from transceivers 22. They again focus on the detector 12. This process works due to the reciprocity of the wave equation, since the transfer function in one direction is the same as that in the other direction. FIG. 5 illustrates the 'training' process. A predefined calibration signal, P, in memory storage is directed, Step 56, to an arbitrary waveform generator, which drives transceivers 22, Step 58, sequentially, the generated signals being focused onto transceiver 12, Step 60, and the received signals stored in memory for time reversal processing, Step 62, after each stored signal is time reversed. See, e.g., T. J. Ulrich et al., "Time reversal and non-linear elastic wave spectroscopy (TR NEWS) techniques," Intl. J. Non-Linear Mech. 43 (2008) 209-216.

Having generally described embodiments of the present invention, the following EXAMPLES provides additional details.

EXAMPLE 1

Figure 6:
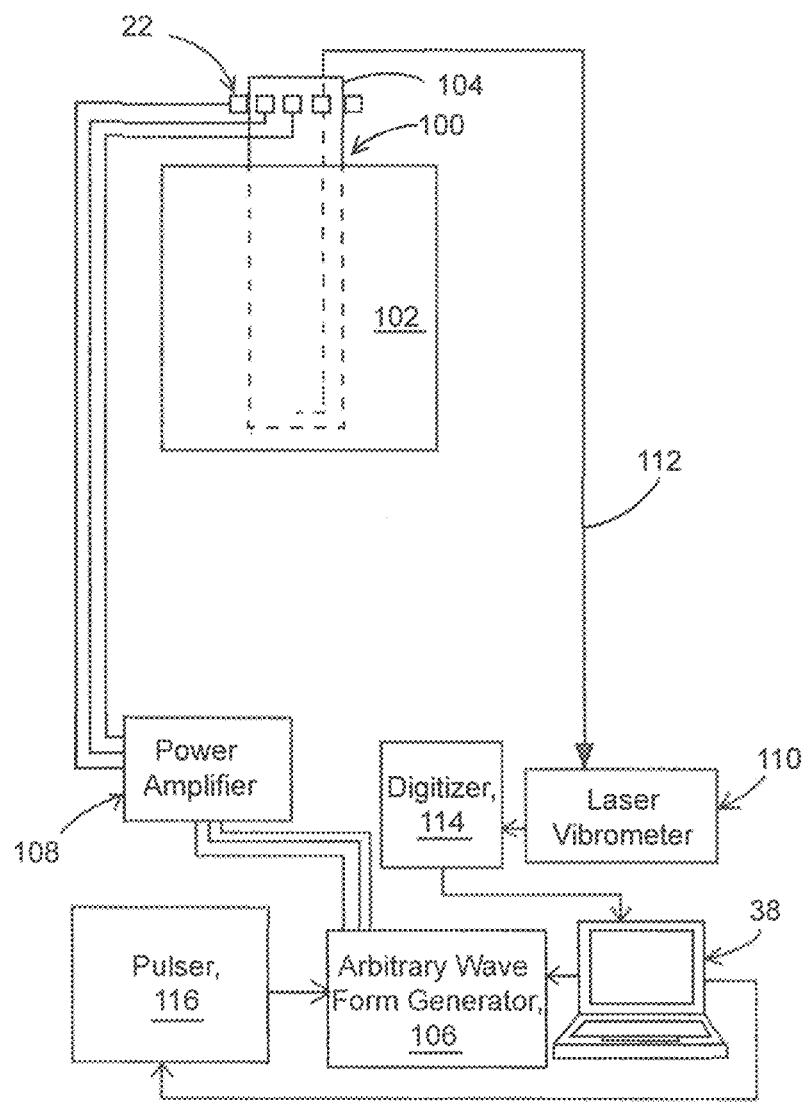
FIG. 6 is a schematic representation of a laboratory apparatus for carrying out reciprocal time reversal measurements for a simulated down hole environment.

FIG. 6 is a schematic representation of an apparatus for carrying out reciprocal time reversal measurements described above in the laboratory for a simulated down hole environment. Pipe, 100, was embedded in block, 102, of Berea Sandstone. Ten acoustic transceivers 22 were affixed to portion, 104, of pipe 100 emerging from block 102. A reference signal, for example, a pulsed (10-20 kHz) sinusoidal waveform having a 50 kHz bandwidth, is directed into at least one arbitrary waveform generator, 106, by computer 38. After amplification by at least one power amplifier, 108, each generator signal is directed to a single transceiver 22, one generator signal at a time. The signal traveling through pipe 100 and block 102 is recorded by laser vibrometer, 110, after being received by fiber optic attachment, 112, disposed inside pipe 100. The signal received for each emission is digitized by digitizer, 114, and directed to computer 38, which time reverses each of the received signals and programs the arbitrary waveform generators 106 with the time-reversed signals. Reciprocal time reversal, in its basic form, includes first sending the last digitized element, then the second to last digitized element and so forth until the entire waveform has been inverted. Focusing in pipe 100 may be improved (typically, to sharpen the focus), by filtering the time-reversed signal (not shown in FIG. 6). Signal averaging may also be performed on the detected signals. The final step is for all of the arbitrary waveform generator to simultaneously direct the time-reversed signals to the transducers through the power amplifiers. During that phase, all the generators are synchronized via pulser, 116. While all the transceivers are emitting, laser vibrometer 110 records the signals generated in the focal volume that are digitized and analyzed for nonlinear components by computer 38.

The time-reversed signals may be broadcasted successively at different amplitudes to assist in the detection of the nonlinear signals. As discussed above, the size of the region probed by focused waves in the formation depends of the wavelength used for the first reference signal.

Figure 7A:
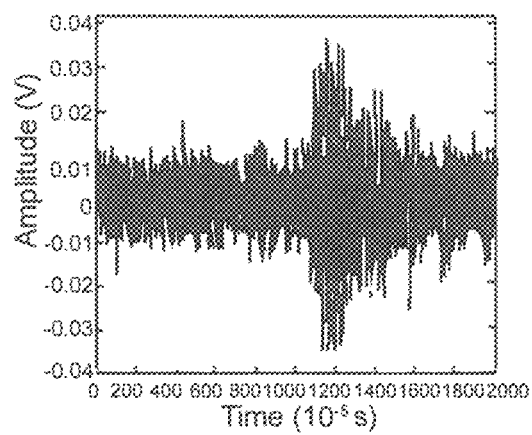
FIG. 7A is a graph of the detected pulse propagation down the pipe in the apparatus shown in FIG. 6, hereof, from a single transducer without time reversal.
Figure 7B:
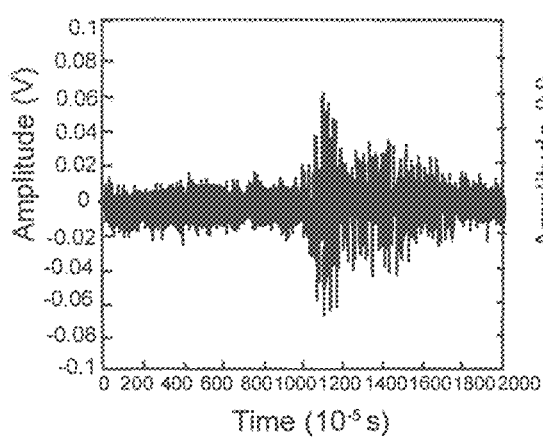
FIG. 7B is a graph of the detected pulse propagation from all 10 transducers without time reversal.
Figure 7C:
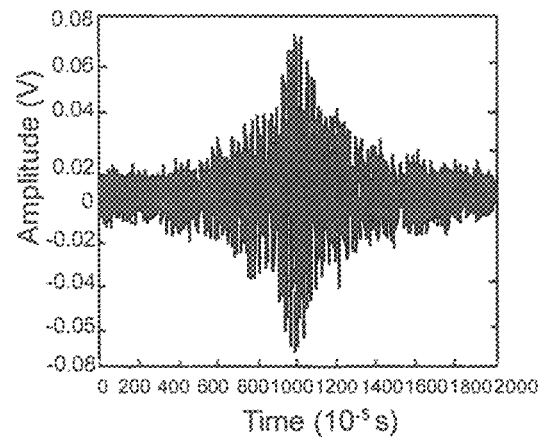
Figure 7D:
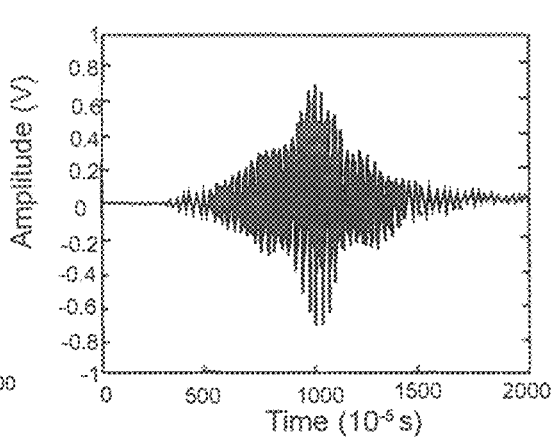
FIG. 7D is a graph of the detected focused pulse propagation from all 10 transducers using classical time reversal.

FIG. 7A is a graph of the detected pulse propagation down pipe 100 from a single transducer 22 without time reversal, while FIG. 7B is a graph of the detected pulse propagation from all 10 transceivers 22 without time reversal. FIG. 7C is a graph of the detected focused pulse propagation down pipe 100 from a single transducer 22 using reciprocal time reversal, while FIG. 7D is a graph of the detected focused pulse propagation down pipe 100 from all 10 transducers using classical time reversal.

The signal strength increases by a factor of 10 when using reciprocal time reversal over that resulting from the use of conventional sources. This is clear example of an apparatus capable of transmitting elastic wave energy to a formation in a simulated borehole/casing/rock system using the method in accordance with embodiments of the present invention.

Figure 8A:
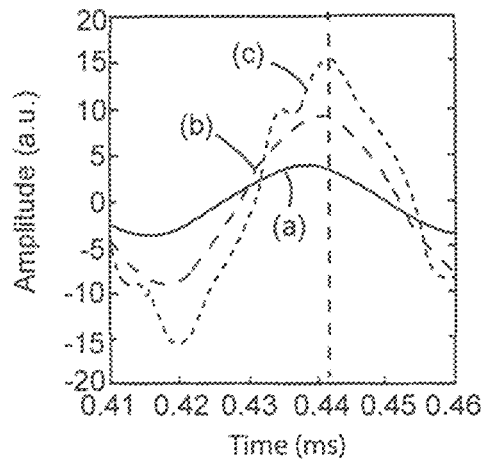
Figure 8B:
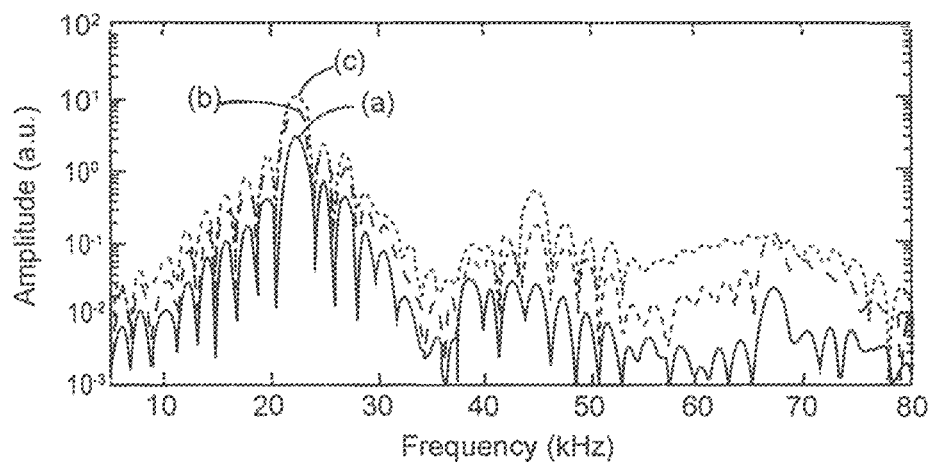
FIG. 8B is a graph of the detected pulse as a function of frequency as the amplitude of the signal pulse increases from (a) to (c).

FIG. 8A is a graph of the delay in the arrival time of a detected pulse in the pipe of the apparatus of FIG. 6 as the amplitude of the signal pulse increases from (a) to (c). As mentioned above, this shift is related to $\alpha$. FIG. 8B is a graph of the detected pulse as a function of frequency as the amplitude of the signal pulse increases from (a) to (c). The fundamental as well as the second and third harmonics are readily observable. As discussed above, $\beta$ may be obtained by monitoring the second harmonic. Monitoring the third harmonic is an alternative method for obtaining $\alpha$. When the bandwidth of the fundamental is broader, however, the third harmonic can partially overlap with the second harmonic, which may make third harmonic measurements more difficult. Additionally, the third harmonic may be influenced by $\delta$ (see Equations 5 above). Due to the relative sizes of $\alpha$ and $\delta$, this latter issue is generally not a serious problem, but having an alternative way of measuring $\alpha$, such as by using the time delay, is advantageous.

Figure 9:
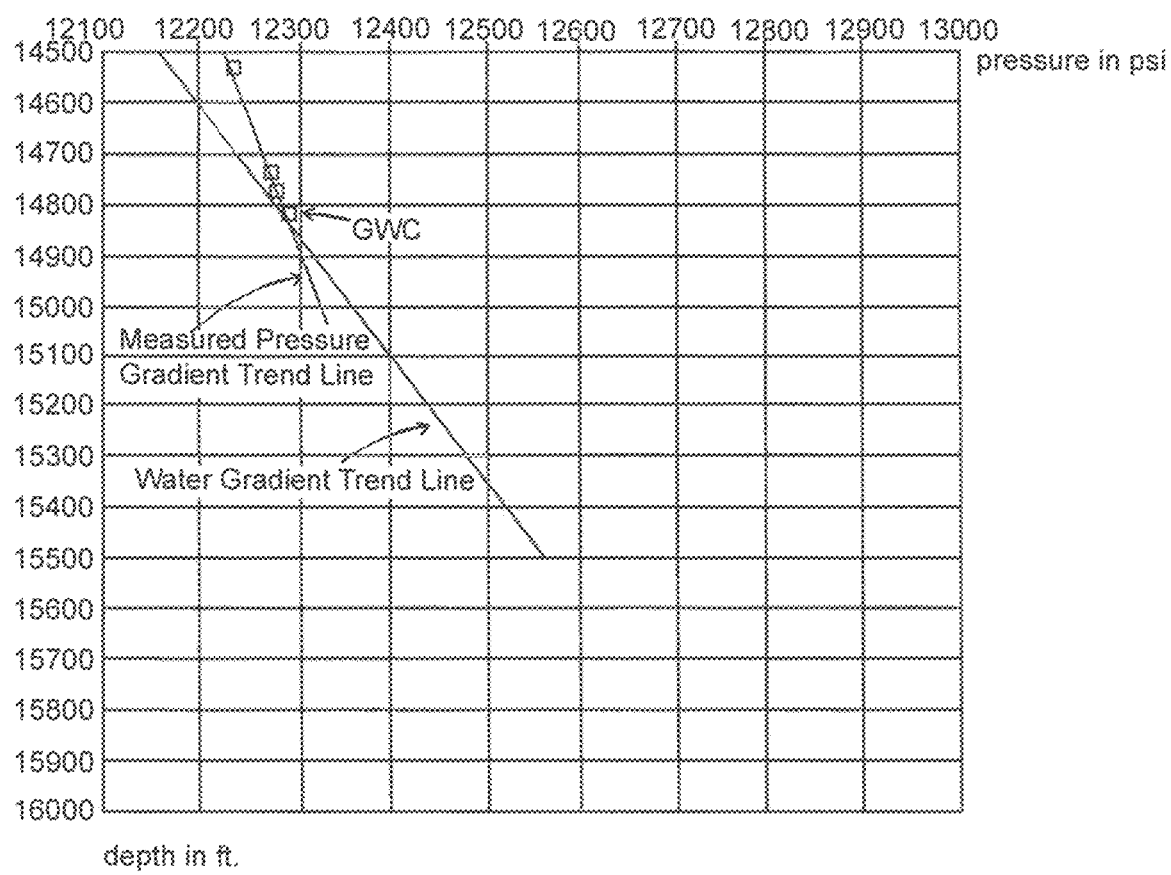
FIG. 9 is a graph of the pore pressure as a function of depth measured by conventional techniques for an actual formation, permitting the prediction of gas/water contacts for locating hydrocarbon deposits.

FIG. 9 is a graph of the pore pressure as a function of depth measured by conventional techniques for an actual formation, permitting the prediction of gas/water contacts (GWC) for locating hydrocarbon deposits.

Once these contacts are located, drilling can be redirected using apparatus 25 in FIG. 2A to accomplish the change in direction.

EXAMPLE 2

Propagation of an Impulsive Elastic Waveform in a Long, Thin Bar

As discussed above, with the aid of time reversal, elastic wave energy is focused at a point in space and an impulsive waveform will be generated. Since this process involves waves traveling through materials, and material properties may be strain dependent, the arrival time of the impulsive waveform may be dependent on the amplitude of the excitation. The term of hysteretic nonlinearity $\alpha$ in the equation of state (Equ. 3) governs this effect.

To verify $\alpha$ can be quantified by monitoring the propagation speed of an elastic wave as a function of the strain amplitude, laboratory experiments were performed. Although the propagation of impulsive elastic waves remains the principal measurement, time reversal is not required to generate the strain since the measurements are restricted to a one-dimensional waveguide over a known propagation distance. The hysteretic nonlinearity parameter has never been measured in this manner, so the determination is validated using nonlinear resonant ultrasound spectroscopy.

Figure 10:
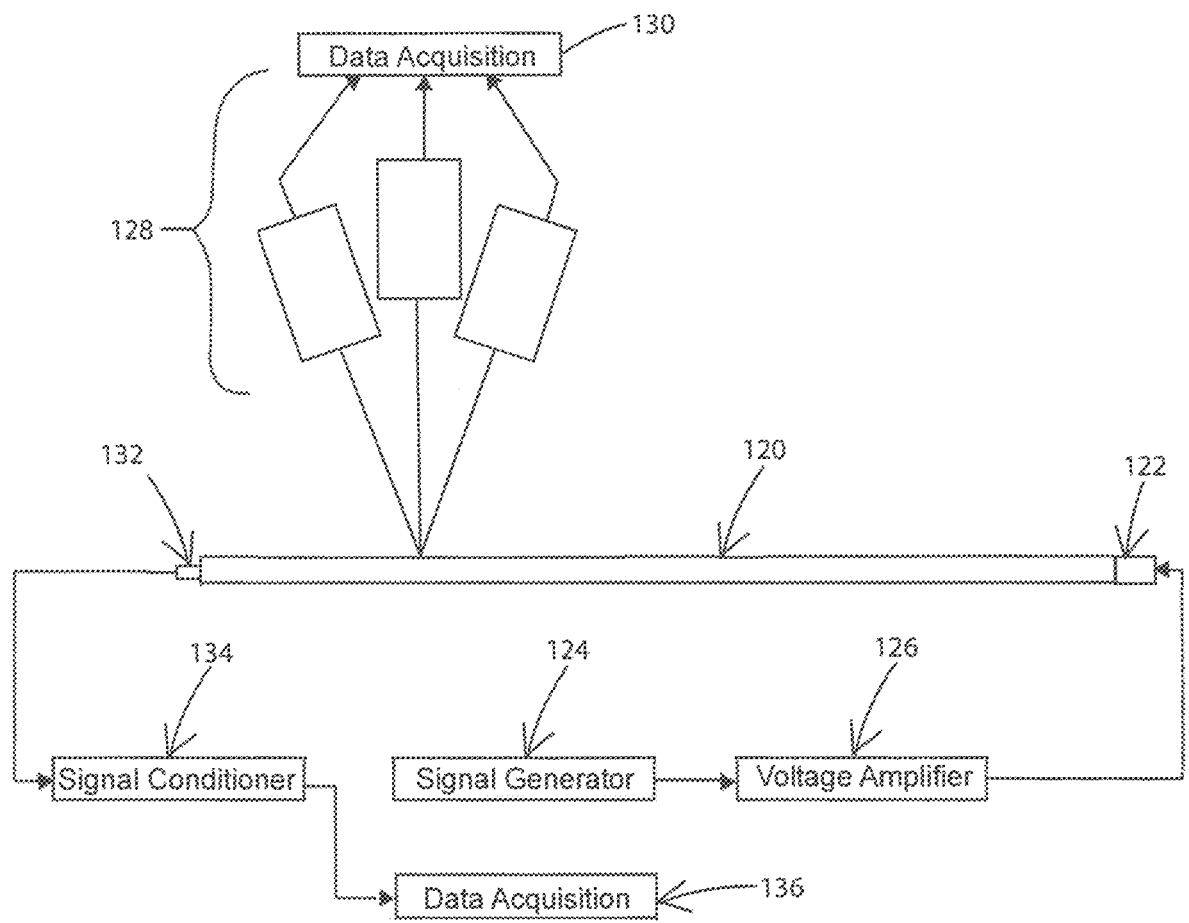
FIG. 10 is a schematic representation of an embodiment of the apparatus used to determine α, and to verify that the determined value of α is meaningful.

FIG. 10 is a schematic representation of the apparatus, 118, used to determine α in sample, 120, of Berea sandstone (Cleveland Quarries, Amherst, Ohio) having a length of 1794 mm (70.63 in) and a diameter of 39.6 mm (1.56 in). The sample was supported by a foam pad, not shown in FIG. 10, in order to simulate free (unconstrained) boundary conditions. Elastic waves were generated using a piezoelectric transducer, 122, epoxied onto one flat end of sample 120. Impulsive elastic waveforms generated in signal generator, 124, and amplified by voltage amplifier, 126, were propagated in sample 120 at different amplitudes. The vibrational response of bar 120 was recorded on the surface of the sample using 3D Laser Doppler vibrometer, 128, and received by data acquisition apparatus, 130.

Returning to FIGS. 2A, 2B, and 6, if one places a vibrational motion sensor, such as a piezoelectric transducer, 132, on wall, 134 of wellbore, 18, in FIGS. 2A and 2B, corresponding to pipe 100 in FIG. 6, one can measure the particle velocity as a function of excitation intensity of the waves generated in the formation by time reversal, from which the peak strain (Equ. 8) can be evaluated in focal volume 28. As described in this EXAMPLE 2 for laboratory experiments, from the time history of the particle velocity and the peak strain, α can be evaluated. With β being available from measurement of the intensity of harmonics, the pore pressure can be determined. Note that since the metal walls or casings of wellbores exhibit linear response to vibrations, the particle velocity, which is the motion excited in the focal region is accurately measured through the wall.

Figure 11A:
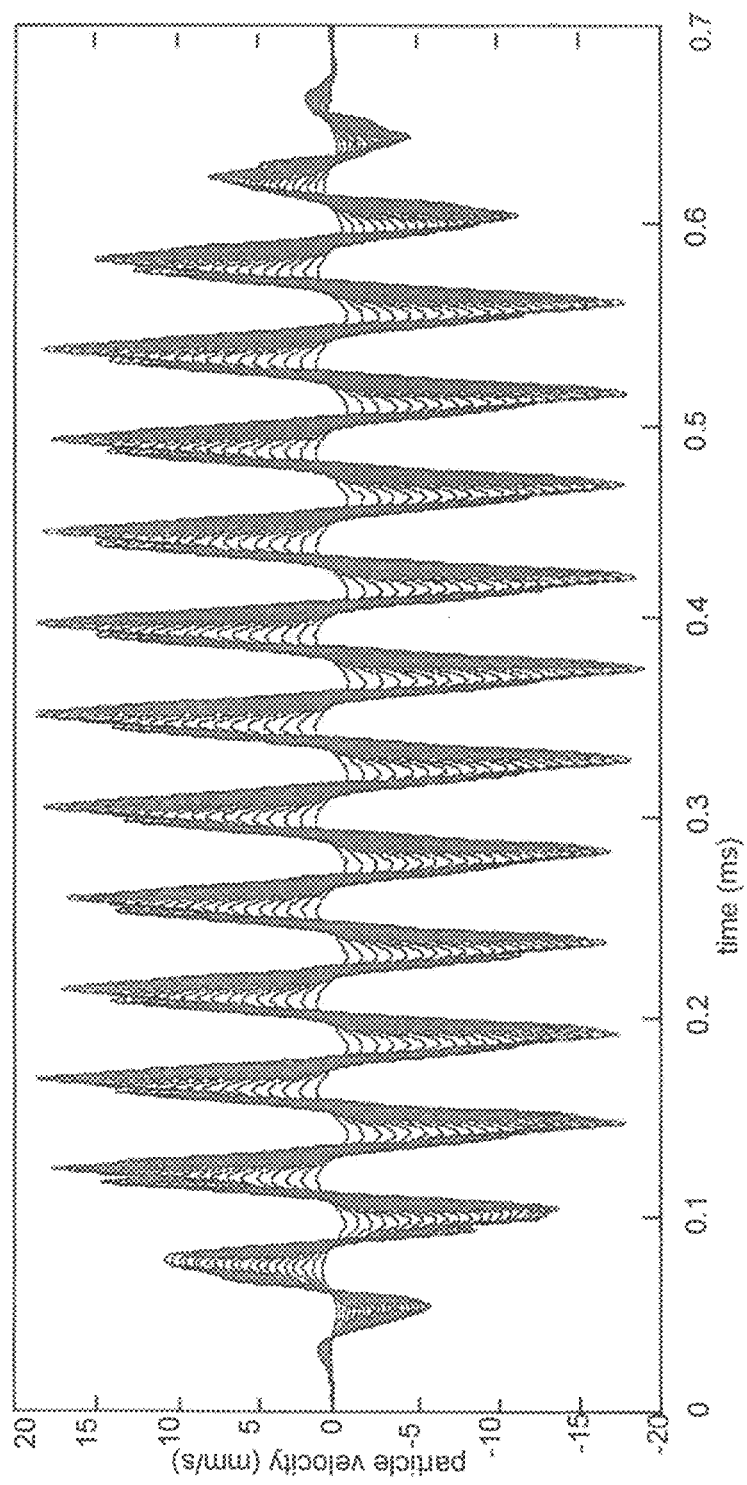
Figure 11B:
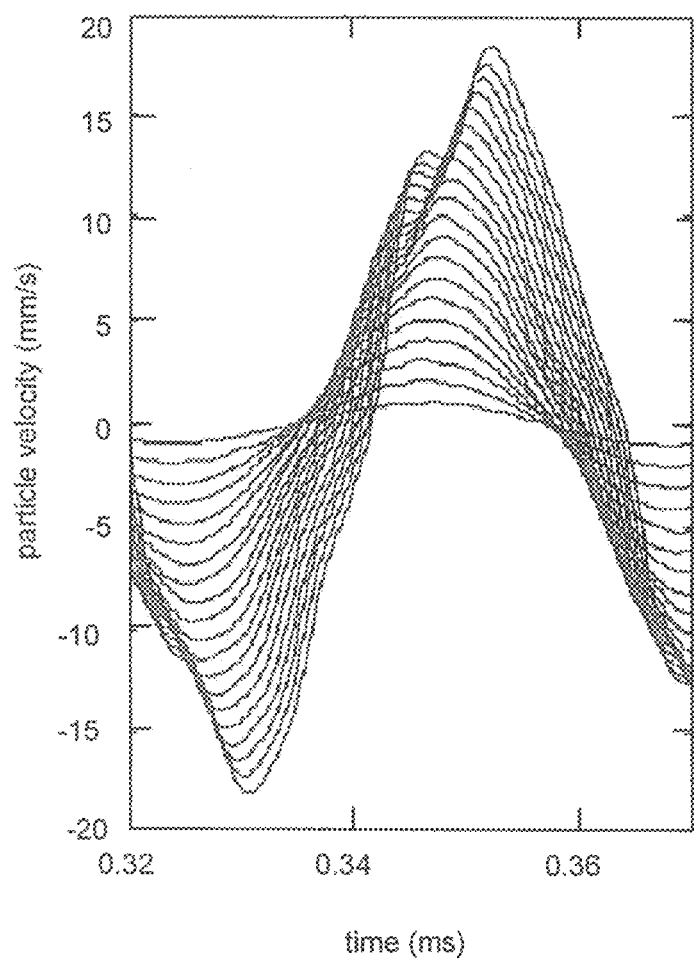
FIG. 11B is an expanded time period between 0.32 ms and 0.37 ms, both being measured at 500 mm from the source of vibrational excitation for 20 source amplitudes.

FIGS. 11A and 11B show the time histories of the axial component of the particle velocity measured at 500 mm from the source 122 for 20 source amplitudes ranging from 1 to 20 Vpp in steps of 1 Vpp (before amplification), with FIG. 11B illustrating an expanded abscissa between 0.32 ms and 0.37 ms. The original sinusoidal waveform observed at the lowest amplitudes progressively evolves into a triangular wave, as a result of hysteretic nonlinearity, with additional distortion caused by classical nonlinearity. It is observed that the waveforms experience a significant delay in arrival time as the source amplitude increases. This delay is observed not only at the extrema (peaks of amplitude) but also at the zero crossings. Classical nonlinearity would not induce any delay at the zero crossings (where the strain is equal to zero), because it produces an instantaneous variation of the modulus without time constants involved. Therefore, the observed delay is a direct consequence of hysteretic nonlinearity.

The data shown in FIGS. 11A and 11B can be further reduced to quantify hysteretic nonlinearity. For a signal measured at the source amplitude i, the signal measured at the source amplitude i-1 is taken as a reference to compute a relative time delay, $\Delta t^{i/i-1}/t_0$. The relative time delay between two signals is estimated by cross-correlation. The time delay between the lowest source amplitude (i=0) and the source amplitude i is then obtained by summation as, $$\Delta t^{i/0}/t_0 = \left(\sum_{n=1}^{i} \Delta t^{n/n-1}\right)/t_0 \quad (6)$$

The relative time delay between the signals is also equal to the relative change in speed of the longitudinal wave, $\Delta c^{i/0}/c_0$. Further, at the perturbation level, the relative change in the Young's modulus E (the modulus involved in the propagation of a longitudinal wave in a long thin bar) is related to the relative change in the speed of the longitudinal wave as, $$\Delta E^{i/0}/E_0 = 2\Delta c^{i/0}/c_0 \quad (7)$$

The relative changes in the elastic modulus over the propagation path of the waveform can be followed as a function of the maximum strain amplitude at the measurement point. The strain component of interest is $\varepsilon_{xx}$, where x is axial direction. The strain component $\varepsilon_{xx}$ can be expressed analytically as a function of the axial component of the particle velocity $v_x$ as, $$\varepsilon_{xx} = \frac{v_x}{c} \quad (8)$$

Recall that the particle velocity is obtained from the vibrational motion measured by 3D Scanning Laser Doppler Vibrometer 110.

Figure 12A:
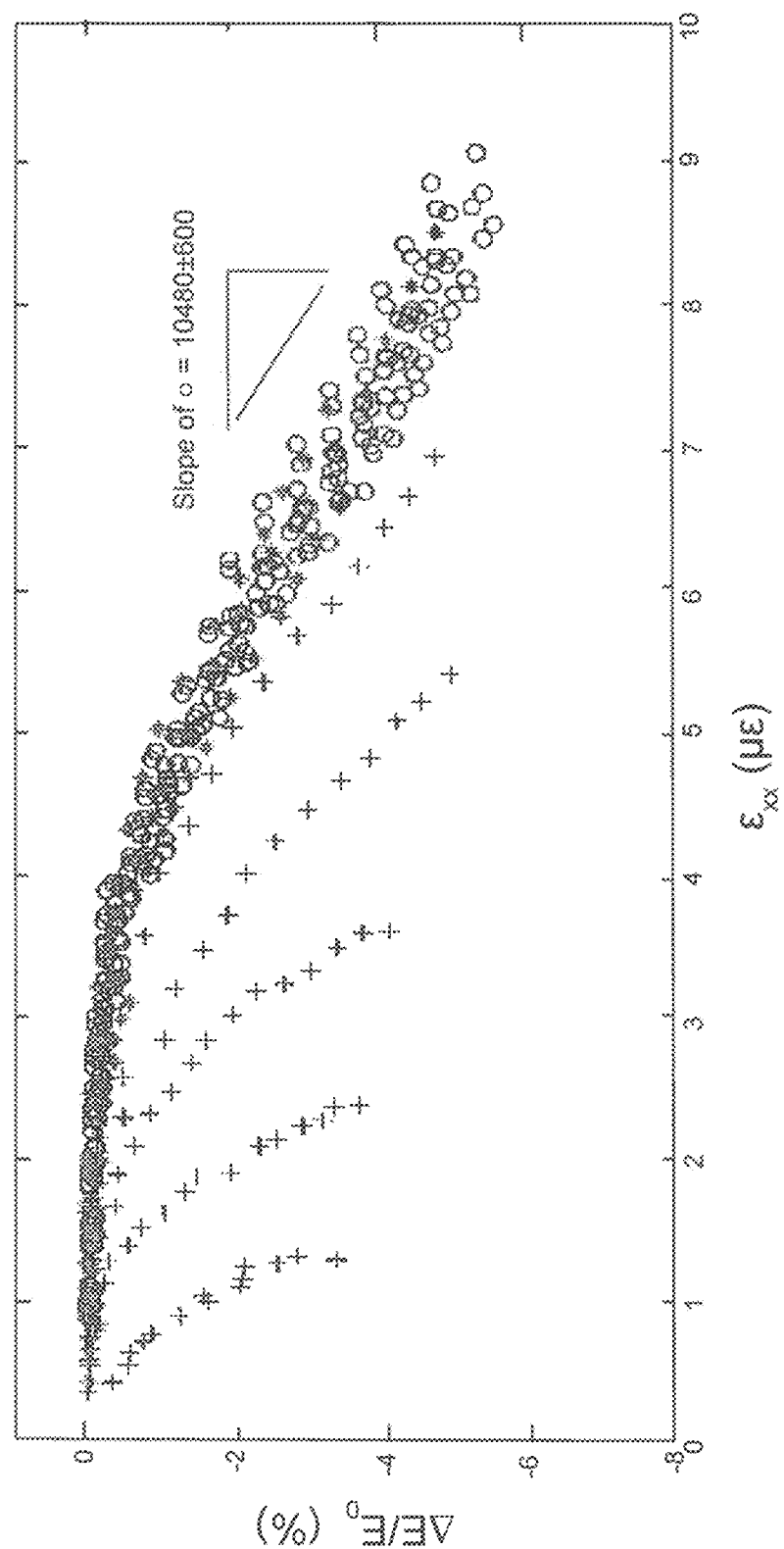
Figure 12B:
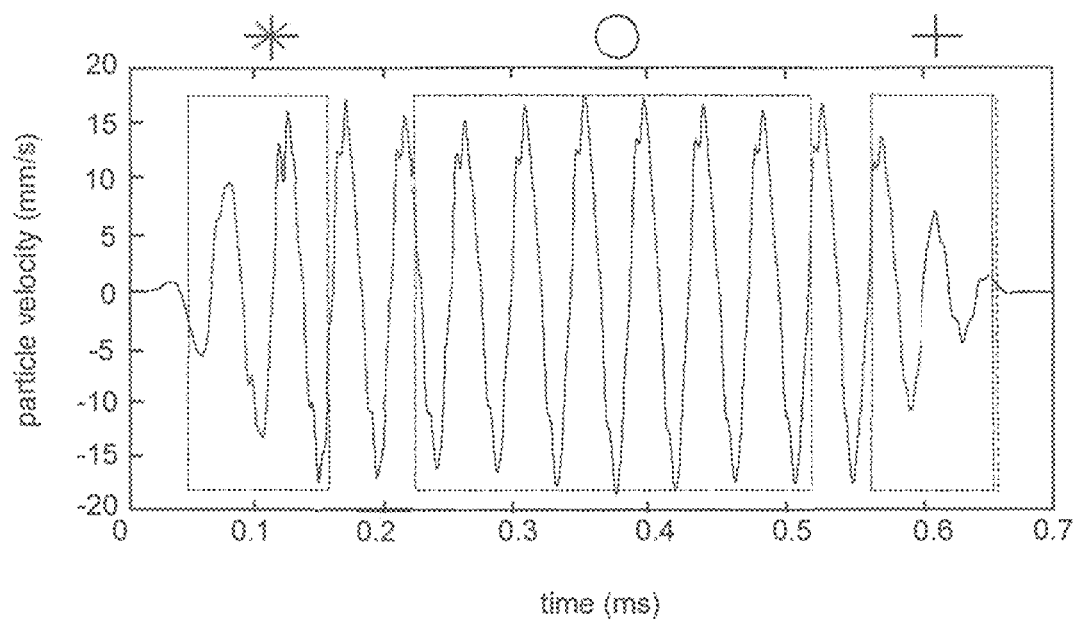
FIG. 12B shows a sample applied pulse, the "star", "circle" and "plus" symbols corresponding to the first five peaks the $9^{th}$-$21^{st}$ peak, and the final five peaks, respectively. peak, and the final five peaks, respectively.

Reduced data from FIGS. 11A and 11B are shown in FIGS. 12A and 12B. Three distinct regimes may be identified in the waveform: (i) the initial portion of the waveform, where the dynamic strain at the measurement point transitions from zero to steady state, and labeled with a "star"; (ii) the center portion of the waveform, where the absolute value of the peak amplitude of the dynamic strain is quasi-constant (that is, steady state), and labeled with a "0"; and (iii) the final portion of the waveform, where the dynamic strain at the measurement point transitions from steady state back to zero, that is, a path similar to the earlier portion of the waveform but in reverse, and also labeled with a "+". In the initial portion of the waveform, the elastic modulus decreases progressively from its undisturbed equilibrium value to a smaller value (ultimately up to 5.3% smaller at the largest source amplitude employed as the steady state is approached). This is the portion typically referred to as conditioning. In the center potion of the waveform, the evolution of the material softening with the strain amplitude is essentially independent of the wave cycle selected for the analysis (that is, similar results are obtained from the $9^{th}$ to $21^{st}$ peaks of the waveforms). In this regime, the slope of the curve is 10480±600 (dimensionless). This value quantifies the hysteretic nonlinearity, but it will be determined in EXAMPLE 3 below how this value compares to the parameter α.

EXAMPLE 3

Nonlinear Resonant Ultrasound Spectroscopy:

Returning to FIG. 10, with minor modifications, the apparatus may be utilized for resonant ultrasound spectroscopy. Sample, 120, of Berea sandstone (Cleveland Quarries, Amherst, Ohio) having a length of 1794 mm (70.63 in) and a diameter of 39.6 mm (1.56 in) is shown. The sample was supported by a foam pad, not shown in FIG. 10. Piezoelectric transducer 122 was driven with a sequence of harmonic voltage signals. Each harmonic signal was applied for 55 ms, and the transient vibrational response was recorded during the last 40 ms of the source signal, to ensure that steady state conditions had been reached. Vibrational spectra were constructed from the harmonic responses. Frequencies ranging between 0.3 kHz and 7 kHz in steps of 2.5 Hz were employed, and at 22 excitation amplitudes ranging between 0.25 to 10 Vpp (before amplification). The axial component of the acceleration was measured on the flat end opposite to the source by an accelerometer using transducer, 132, the output of which was processed by signal conditioner, 134, and analyzed using data acquisition apparatus 136. The resonance frequencies are not computed for the first three modes because of the poor signal-to-noise ratio.

Figure 13A:
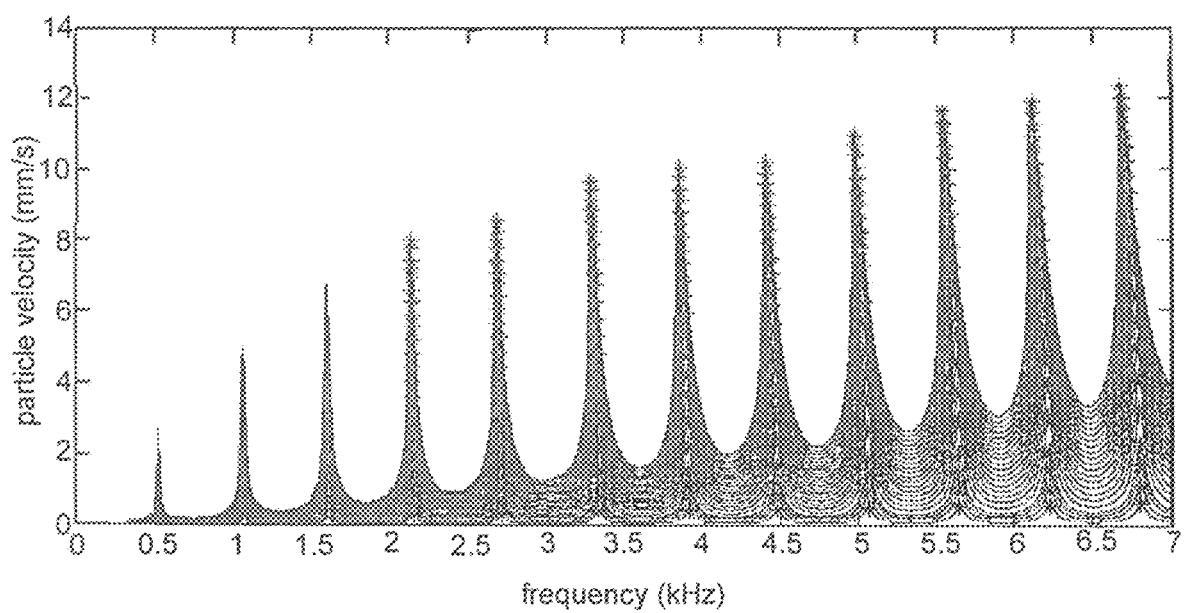
FIG. 13A is a graph of the vibrational spectra measured on a sample of Berea sandstone at 22 source amplitudes, the first 12 modes of longitudinal vibration $L_1$ through $L_{12}$ being indicated, the star symbols denoting the location of the resonances for all source amplitudes, while FIG. 13B clearly shows the shift in frequency for $L_{10}$ as an example.
Figure 13B:
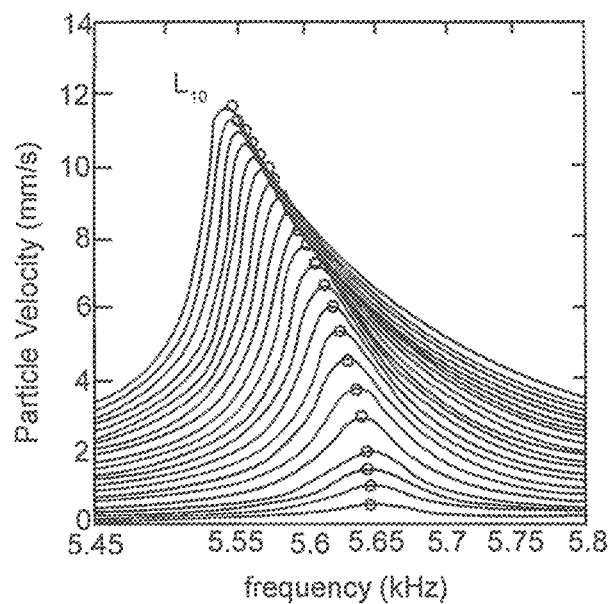

Any resonance mode can be selected to quantify hysteretic nonlinearity as long as the mode type is purely longitudinal. The vibrational spectra for this experiment are shown in FIGS. 13A and 13B. Material softening, a drop in the effective elastic moduli resulting from the fact that elastic moduli are dependent on the strain amplitude and strain rate, is observed when the drive amplitude of the source becomes sufficiently large (Equ. 3). For a given drive amplitude, such softening can be quantified by plotting the relative frequency shift as a function of the maximum strain in the sample, the slope of which is the nonlinear parameter $\alpha$. The maximum strain in the sample may be inferred analytically from the measured vibrational response. For the longitudinal modes, the strain component of interest is $\varepsilon_{xx}$. For a system having a one-dimensional geometry and unconstrained boundaries, the expression given in Eq. (8) can also be used in the context of a resonance experiment to relate the maximum amplitude of the axial component of the particle velocity at the free end of the sample (where data is acquired) to the maximum amplitude of the axial component of the strain in the sample.

Figure 14:
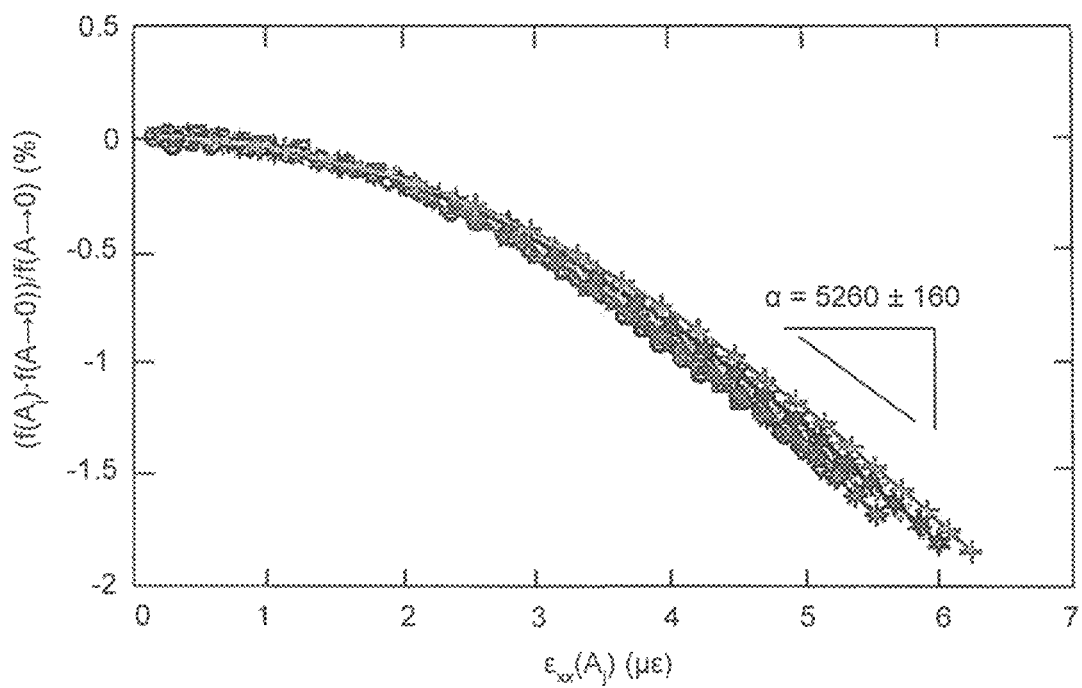
FIG. 14 is a graph illustrating the relative frequency shift as a function of the strain component $\varepsilon_{xx}$ for the longitudinal modes $L_4$ through $L_{12}$.

As depicted in FIG. 14, the relative frequency shift varies almost linearly with the maximum strain beyond 4 microstrains. When a mode has sufficient data beyond this strain value, the points may be linearly fitted and the slope of this fit calculated. It appears that material softening converges to a single value (all curves superimpose) of $\alpha=5260\pm160$ for resonance modes $L_6$ through $L_{12}$. Below the $6^{th}$ resonance mode, the elastic response does not have a sufficiently large amplitude to reach the threshold strain value of about 4 microstrain.

The slope of the relative change of the resonance frequency is approximately twice the value of the relative change of the Young's modulus observed in the pulse propagation experiment, which is consistent with the analytical relationship between Young's modulus and resonance frequency of a longitudinal mode at the perturbation level, $$\Delta E/E_0 = 2\Delta f/f_0 \quad (9)$$

Therefore, the quantification of hysteretic nonlinearity in the pulse propagation experiment and with nonlinear resonant ultrasound spectroscopy are equivalent.

In the pulse propagation experiments, the Young's modulus is approximately constant below 4 microstrains in the conditioning phase and varies linearly with strain above this value, with a sharp transition between the two regimes (see FIGS. 11A and 11B). In the resonance experiment, the resonance frequency also varies linearly with strain beyond 4 microstrains but experiences a smooth transition to this regime. During this transition, classical nonlinearity plays a substantial role. Classical nonlinearity can induce a frequency shift in the resonance experiment, but cannot induce a time delay in the pulse propagation experiment; hence, the sharp transitions in FIGS. 11A and 11B. In this sense, it is possible to decouple the contributions from classical nonlinearity and nonequilibrium dynamics in the pulse propagation experiment.

In summary, application of a method that combines time reversal and elastic nonlinearity (TR NEWS) provides the means to quantitatively probe for over pressured regions in advance of the drilling bit, and to determine the distance to an over pressured region. Moreover, gas/water contacts may be located in accordance with the teachings of the present invention, and drilling directed to more successfully locate hydrocarbons.

Time-reversal technique disclosed herein may be used to determine characteristics of materials, such as subsurface materials. Subsurface materials may refer to materials located beneath the surface/located underground. Subsurface materials may refer to materials that are not exposed at the surface of the ground. Characteristics of materials may refer to attributes, features, qualities, properties, and/or other characteristics of materials. Time-reversal technique disclosed herein may be used to determine qualitative and/or quantitative characteristics of materials. The present disclosure may be used to provide a highly focused and discrete measurement method using nonlinear acoustics and Time Reversed (TR) source propagation at downhole conditions.

For instance, time-reversal technique (e.g., classical time-reversal technique, reciprocal time-reversal technique) may be used to determine integrity of subsurface structures, such as a wellbore. Time-reversal technique may be used to focus wave energy in a subsurface volume of interest to probe/explore nonlinear properties of materials within the subsurface volume of interest, and the integrity of the wellbore may be determined from the nonlinear properties of materials. Exploration of other subsurface materials are contemplated.

For example, one or more transceivers (e.g., a first transceiver) may be configured to transmit one or more pulsed sinusoidal acoustic signals through a subsurface volume of interest, such as a subsurface volume of a wellbore. A pulsed sinusoidal acoustic signal may be transmitted through entirety of the subsurface volume or through a part of the subsurface volume. For example, the transceiver(s) may be located at the center of the subsurface volume and the pulsed sinusoidal acoustic signal may be transmitted outward from the center of the subsurface volume to one or more transceiver located outside the subsurface volume.

The subsurface volume of the wellbore include the region being probed using the time-reversal technique. The subsurface volume of the wellbore may include one or more materials are that to be probed using the time-reversal technique. For example, the subsurface volume of the wellbore may include casing, rock, and concrete between the casing and the rock, and/or other materials.

A pulsed sinusoidal acoustic signal may have a particular frequency/wavelength. That is, the transceiver(s) may transmit, through the subsurface volume, a pulsed sinusoidal acoustic signal of a particular frequency/wavelength. In some implementations, the frequency/wavelength of the pulsed sinusoidal acoustic signal may determine the size of the subsurface volume of interest (e.g., the subsurface volume of the wellbore). That is, the frequency/wavelength of the pulsed sinusoidal acoustic signal may determine the size of the region being probed using the time-reversal technique. The size of the subsurface volume being probed may be determined by the wavelength $\lambda$ (inverse of the frequency) of the pulsed sinusoidal acoustic signal. For example, the subsurface volume may be a hemisphere with (approximate) radius of $\lambda/4$ to $\lambda/2$. Thus, the frequency/wavelength of the pulsed sinusoidal acoustic signal may determine how large of a volume is probed using the time-reversal technique. The subsurface volume may extend vertically and/or laterally. For instance, the frequency/wavelength of the pulsed sinusoidal acoustic signal may determine the depth of the region being probed. By changing the frequency/wavelength of the pulsed sinusoidal acoustic signal, the size (e.g., depth) of the volume being probed may be changed.

The time-reversal technique may utilize an integrated effect to probe different locations. For example, a particular frequency of the pulsed sinusoidal acoustic signal may be used to probe a subsurface volume that penetrates to a certain depth in the ground and determine characteristics of materials into that depth. The frequency of the pulsed sinusoidal acoustic signal may be changed to increase the depth of penetration and probe deeper into the ground. Characteristics of materials added in the deeper penetration may be determined by taking into account the characteristics of the materials in the original probe. For instance, the original probe may penetrate into a casing to determine the characteristics of the casing. The deeper probe may penetrate into both the casing and concrete adjacent to the casing. The measurements from the deeper probe may be deconvolved to effects from the casing and effects from the concrete, and the characteristics of the concrete within the deeper probe may be determined. Thus, the size of the subsurface volume that is being probed may be changed (e.g., incrementally increased) to determine characteristics of subsurface materials in different locations.

One or more transceivers (e.g., a second transceiver) may be configured to detect the pulsed sinusoidal acoustic signal(s) transmitted though the subsurface volume of interest (e.g., the subsurface volume penetrated by the wellbore). Detecting a pulsed sinusoidal acoustic signal may include one or more of identifying, measuring, receiving, and/or otherwise detecting the pulsed sinusoidal acoustic signal. The pulsed sinusoidal signal(s) may be time-reversed for transmission back through the subsurface volume of interest. The transceiver(s) that detected the pulsed sinusoidal acoustic signal(s) and/or other transceiver(s) may be configured to transmit the time-reversed acoustic signal(s) of the pulsed sinusoidal acoustic signal(s) through the subsurface volume of interest. Thus, the time-reversed acoustic signal(s) may be transmitted back through the subsurface volume being probed.

The time-reversal technique may utilize time-reversed acoustic signal(s) to probe the subsurface volume of interest. The Green function that dictates propagation may cause the time-reversed acoustic signal(s) to create a version, or an approximation, of the original source pulse. The time-reversal technique may utilize reciprocity (e.g., reciprocity of wave equation in the Green function) to focus wave energy in the subsurface volume of interest. For example, transmission of the time-reversed acoustic signal(s) through the subsurface volume of the wellbore may result in generation of focused acoustic signal(s) in the subsurface volume of the wellbore. The focused acoustic signal(s) may focus wave energy in the subsurface volume of the wellbore. The focused acoustics signal(s)/focused wave energy may be used to probe the characteristics of the materials within the subsurface volume of the wellbore.

One or more transceivers inside and/or near the subsurface volume of interest (e.g., the subsurface volume of the wellbore) may be configured to detect the focused acoustic signal in the subsurface volume of the wellbore. Detecting the focused acoustic signal may include one or more of identifying, measuring, receiving, and/or otherwise detecting the focused acoustic signal. For example, the transceiver(s) that transmitted the pulsed sinusoidal acoustic signal(s) through the subsurface volume of interest and/or one or more transceivers coupled to materials being probed may be used to detect the focused acoustic signal. The characteristics of materials within the subsurface volume of interest may be determined based on the focused acoustic signal and/or other information. For example, the integrity of the wellbore may be determined based on the focused acoustic signal in the subsurface volume of the wellbore and/or other information. The integrity of the wellbore may include and/or be affected by the integrity of the casing, integrity of the rock around the casing, the integrity of the concrete between the casing and rock, the integrity of the casing-concrete interface, the integrity of the concrete-rock interface, and/or the integrity of other materials inside/around the wellbore In some implementations, the characteristics of materials that are determined based on the focused acoustic signal may include one or more value(s) of one or more nonlinear material parameters. A nonlinear material parameter may refer to a parameter of material that exhibits a nonlinear response to one or more stimuli. A nonlinear material parameter may refer to a parameter of material that exhibits nonlinear response to the focused acoustic signal/focused wave energy. The time-reversal technique may utilize time-reversed acoustic signal(s) to focus energy into the subsurface volume of interest and measure the nonlinear material parameter(s) in the subsurface volume of interest.

In some implementations, the nonlinear material parameter(s) that are measured using focused acoustic signal/focused wave energy may include higher-order elastic moduli and/or other nonlinear material parameters, such as alpha, beta and delta. The focused acoustic signal and/or other information may be used to determine the values of nonlinear material parameters alpha, beta, delta, and/or other nonlinear material parameters in the subsurface volume of interest. The values of nonlinear material parameters alpha, beta, delta, and/or other nonlinear material properties may change with changes in materials within the subsurface volume of interest. For example, the values of nonlinear material parameters alpha, beta, delta, and/or other nonlinear material properties may change with changes in integrity of the wellbore, such as with formation of defect in the wellbore. The values of nonlinear material parameters alpha, beta, delta, and/or other nonlinear material parameters may be used to determine other physical properties of materials in the subsurface volume of interest.

The value(s) of nonlinear material parameter(s) in the subsurface volume of interest may be used to determine other characteristics of materials within the subsurface volume of interest. For example, the integrity of the wellbore may be determined based on the value(s) of nonlinear material parameter(s) in the subsurface volume of the wellbore and/or other information. That is, determination of the integrity of the wellbore based on the focused acoustic signal in the subsurface volume of the wellbore may include determination of one or more values of one or more nonlinear material parameters in the subsurface volume of the wellbore based on the focused acoustic signal, and determination of the integrity of the wellbore based on the value(s) of the nonlinear material parameter(s) in the subsurface volume of the wellbore.

In some implementations, different portions of the wellbore/surrounding material may be explored by changing the size (e.g., depth) of the surface volume of the wellbore (by changing the frequency of the pulsed sinusoidal acoustic signal). This provides the ability to probe material characteristics at specific locations (e.g., specific distance from borehole scan). For example, the frequency of the pulsed sinusoidal acoustic signal may be set to different values to inspect the casing in the wellbore, the rock around the casing, the concrete between the casing and rock, the casing-concrete interface, the concrete-rock interface, and/or other locations inside/around the wellbore.

Figure 15A:
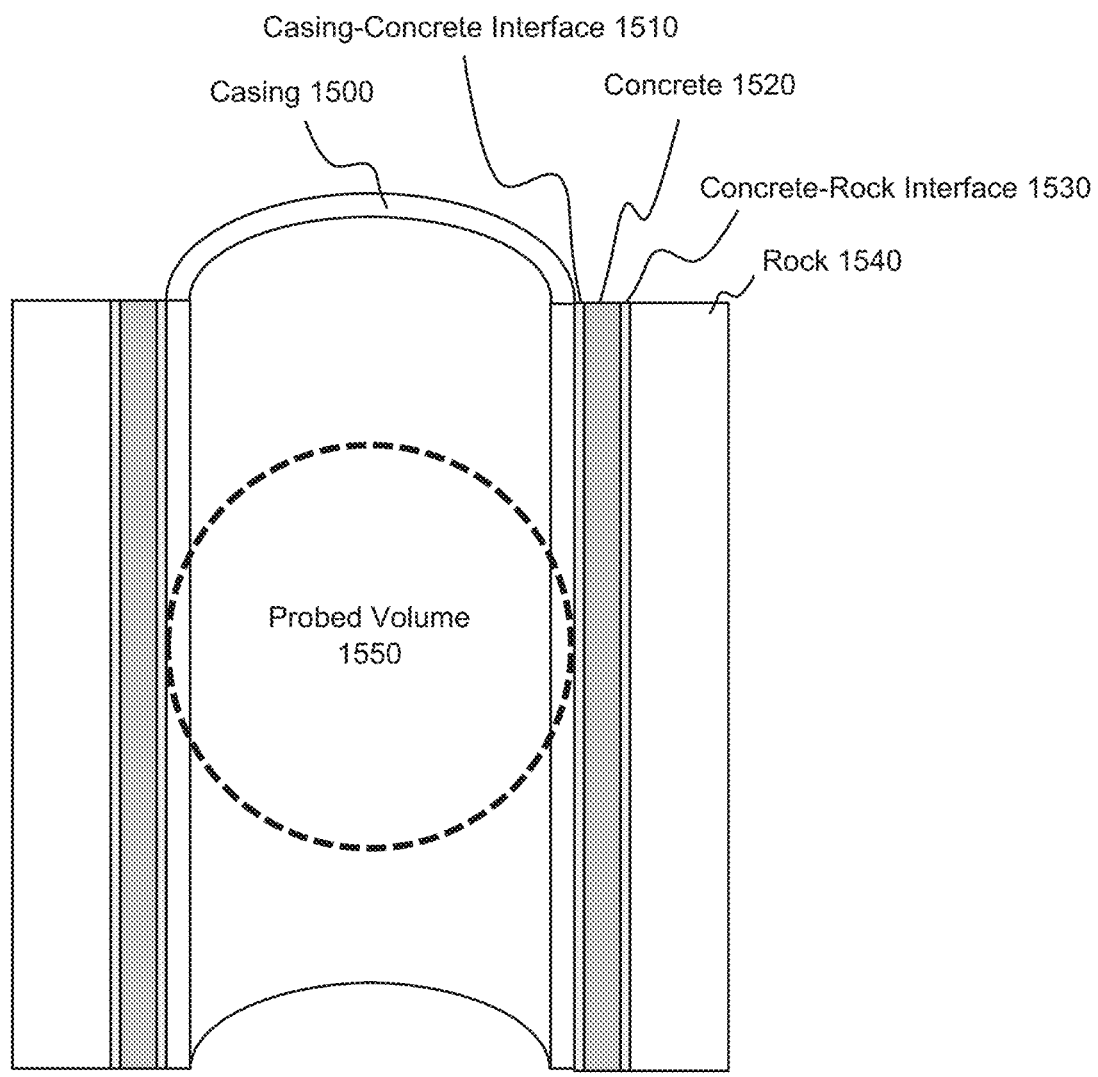
FIG. 15A illustrates an example probed volume.
Figure 15B:
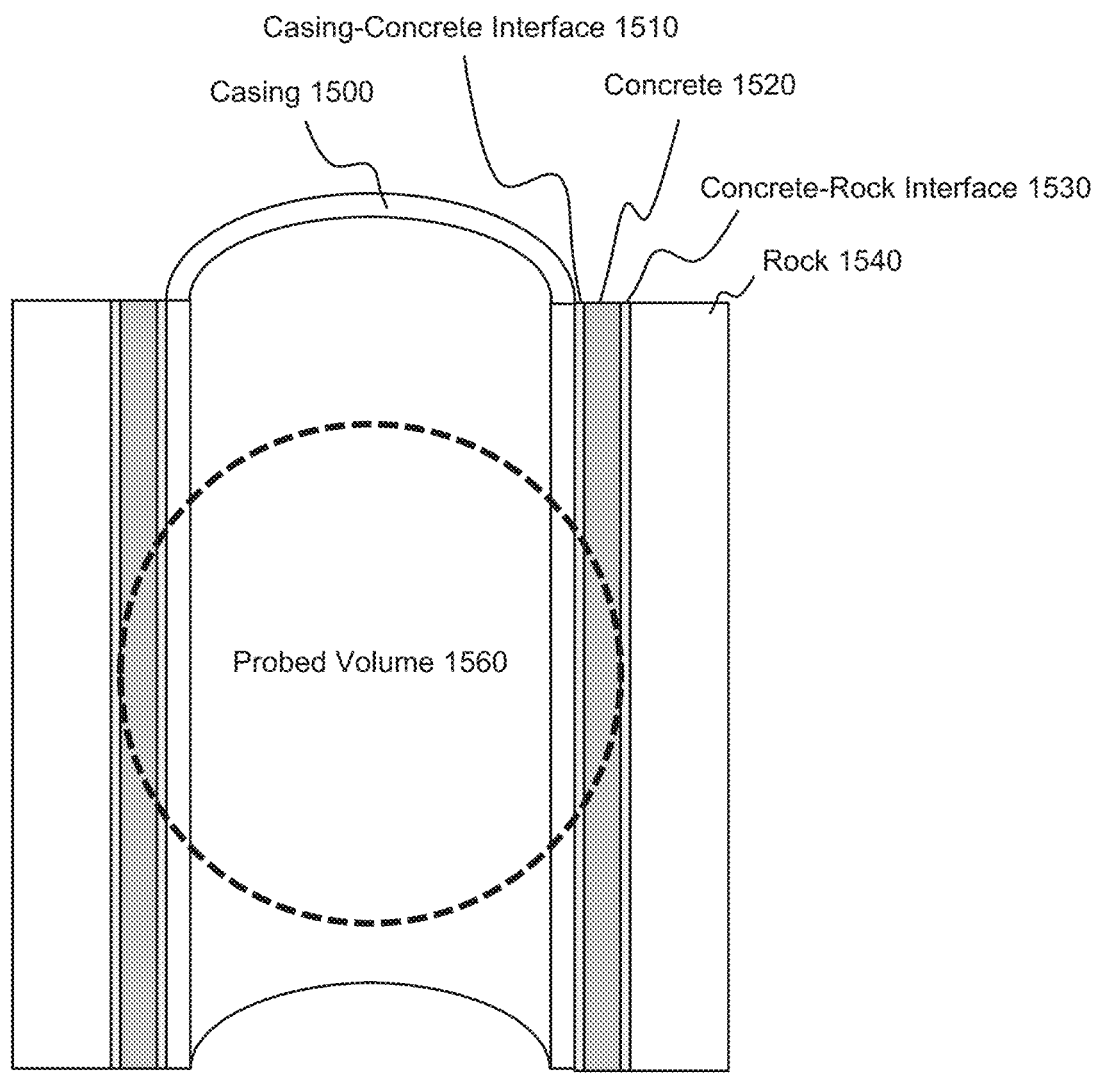
FIG. 15B illustrates an example probed volume.
Figure 15C:
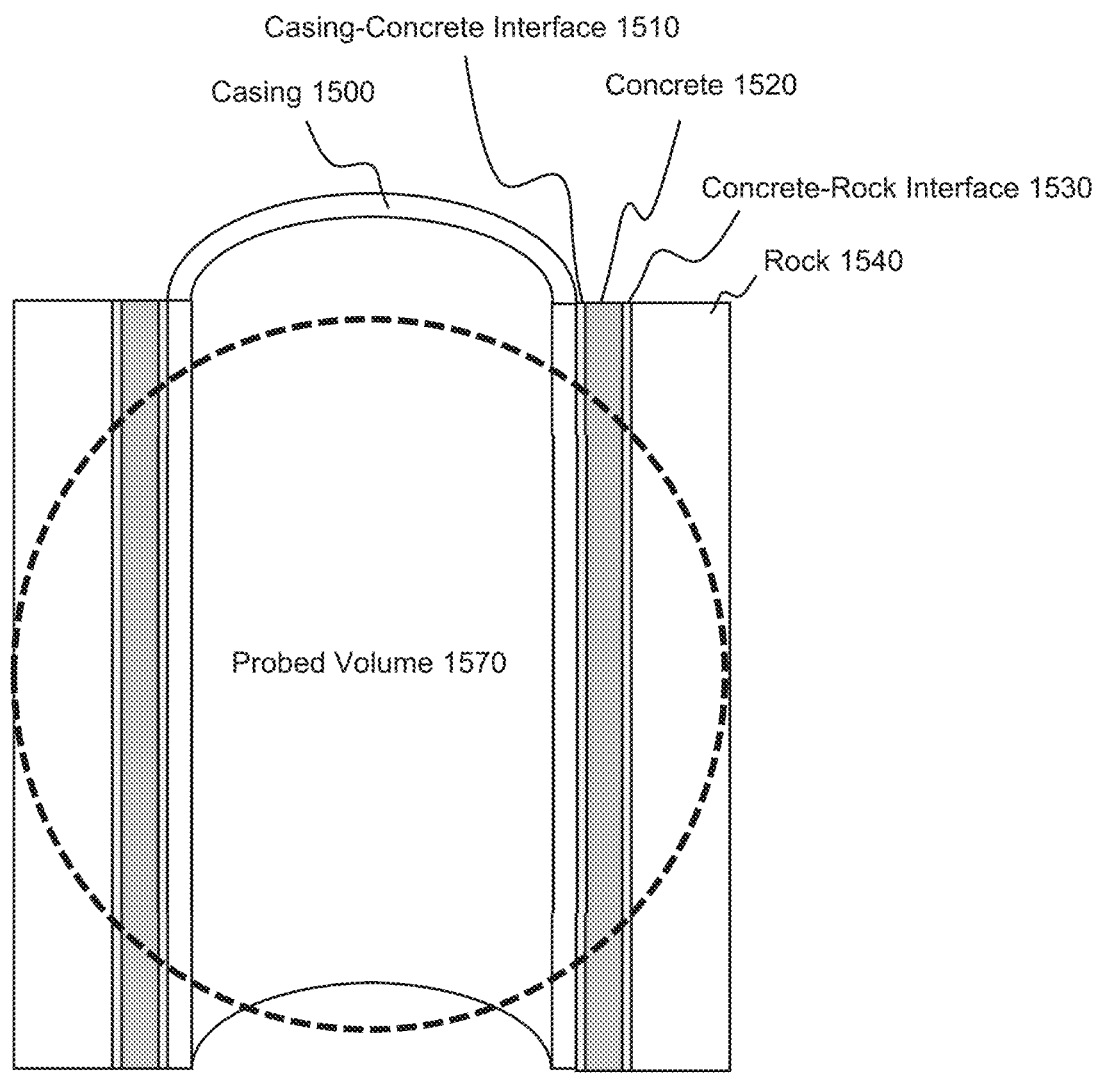
FIG. 15C illustrates an example probed volume.

For instance, FIGS. 15A, 15B, and 15C illustrate example sizes of probed volume 1550, 1560, 1570 using different frequency of the pulsed sinusoidal acoustic signal. Use of different frequency enables different portions of the wellbore/surrounding region to be probed. For example, the frequency of the pulsed sinusoidal acoustic signal may be set to probe the casing 1500 in FIG. 15A. The frequency of the pulsed sinusoidal acoustic signal may be set to probe the casing 1500, the casing-concrete interface 1510, and the concrete 1520 and in FIG. 15B. The frequency of the pulsed sinusoidal acoustic signal may be set to probe the casing 1500, the casing-concrete interface 1510, the concrete 1520, the concrete-rock interface 1530, and the rock 1540 in FIG. 15C. Other sizes and locations of probed volume are contemplated.

While the probed volume are shown as being spheres in FIGS. 15A, 15B, and 15C, this is merely as examples and is not meant to be limiting. For example, the actual volume that is probed may depend on the properties of materials involved, which may distort the shape to a non-idealized sphere/shape. For instance, the wave speed in the fluid in the borehole may be less than in the concrete, rock, or steel layers. This may result in the wavelength in the borehole being smaller for the same frequency, causing the probed volume to be smaller in the borehole. On the other hand, the steel layer may have the highest wave speed of all the layers and may thus have the largest wavelength, resulting in increase in the volume of probing. The formation and concrete layers may have wave speeds between these extremes, which may impact the shape/size of the volume of probing. Other factors that impact the shape/size of the volume of probing may include transceiver radiation pattern, placement of the transceiver (e.g., centralized in the borehole or pushed to one side), coupling to specific wave types (e.g., Stonely waves), and/or borehole modes.

In some implementations, characteristics of materials within the subsurface volume of interest may be determined based on comparison of the value(s) of the nonlinear material parameter(s) with baseline value(s) of the nonlinear material parameter(s). For example, the determination of the integrity of the wellbore based on the value(s) of the nonlinear material parameter(s) may include determination of the integrity of the wellbore based on comparison of the value(s) of the nonlinear material parameter(s) with baseline value(s) of the nonlinear material parameter(s). For instance, the integrity of the wellbore may be determined based on comparison of measured values of nonlinear material parameters alpha, beta, delta, and/or other nonlinear material parameters in the subsurface volume of the wellbore with baseline values of nonlinear material parameters alpha, beta, delta, and/or other nonlinear material parameters.

A baseline value of a nonlinear material parameter may refer to a value of the nonlinear material parameters that is used for comparison or control. A baseline value of a nonlinear material parameters may include initially/previously measured value of the nonlinear material parameter. For example, a baseline value of a nonlinear material parameter may refer to a value of the nonlinear material parameters that was measured (using the time-reversal technique) when one or more characteristics of material in the subsurface volume of interest is known. For example, a baseline value of a nonlinear material parameter may refer to a value of the nonlinear material parameters that was measured when the integrity of the wellbore is known (e.g., after completion of the wellbore).

Changes in the value(s) of the nonlinear material parameter(s) from the baseline value(s) may indicate changes in characteristics of material in the subsurface volume of interest. For example, deviation of the value(s) of the nonlinear material parameter(s) from the baseline value(s) of the nonlinear material parameter(s) (different between the value(s) and the baseline value(s)) may indicate formation of one or more defect in the subsurface volume of the wellbore. For instance, the subsurface volume of the wellbore may include casing, rock, and concrete between the casing and the rock, and/or other materials, and the deviation of the value(s) of the nonlinear material parameter(s) from the baseline value(s) of the nonlinear material parameter(s) may indicate formation of one or more defects in the casing, one or more defects in the rock, one or more defects in the concrete, one or more defects at casing-concrete interface, one or more defects at rock-concrete interface, and/or other defect between the times at which the baseline value(s) and the value(s) were measured. For example, formation of micro-cracks and/or macro-cracks in the subsurface volume of the wellbore may lead to higher nonlinear response in the subsurface volume of the wellbore.

In some implementations, extent of the deviation of the value(s) of the nonlinear material parameter(s) from the baseline value(s) of the nonlinear material parameter(s) may indicate extent of the defect(s) in the subsurface volume of the wellbore. For example, the amount of difference between the value(s) and the baseline value(s) may indicate an amount of defect(s) that have formed in the subsurface volume of the wellbore between the measurements. For instance, increase in values of nonlinear material parameters alpha, beta, and/or delta may indicate formation of defect(s) in the subsurface volume of the wellbore, with larger values of nonlinear material parameters alpha, beta, and/or delta corresponding to larger defect(s) in the subsurface volume of the wellbore. In some implementations, the value(s) of nonlinear material parameters alpha, beta, and/or delta may decrease based on the defect destroying the elastic nature of the materials. For example, if the defect(s) get very large, the defect(s) may destroy the elastic properties of the materials, which may result in low value(s) of nonlinear material parameters alpha, beta, and/or delta. In some implementations, the comparison of the values and baseline value(s) may include tracking how the value(s) changes from the baseline value(s). That is, rather than simply looking at whether and by how much the value(s) have changed from the baseline value(s) at a moment in time, the profile of changes in the value(s) from the baseline value(s) may be used to determine formation/evolution of defects.

Figure 16:
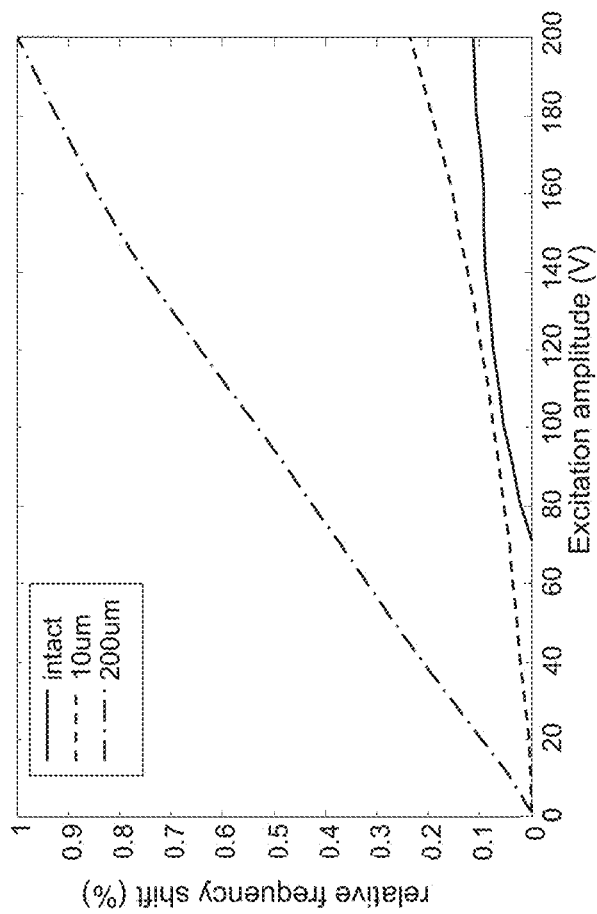
FIG. 16 illustrates example changes in nonlinear response of materials due to micro annulus.

FIG. 16 illustrates example changes in nonlinear response of materials due to micro annulus. FIG. 16 shows example relative frequency shift as a function of excitation amplitude for three different casings. The three casings may have different sizes of micro annulus between the casings and the cement around the casings. The value of nonlinear material parameter alpha may be calculated from the slopes of curves shown in FIG. 16. As shown in FIG. 16, the curve with the largest slope (largest value of alpha) corresponds to the casing with the largest micro annulus while the curve with the smallest slope (smallest value of alpha) corresponds to the casing with the no micro annulus.

Figure 17:
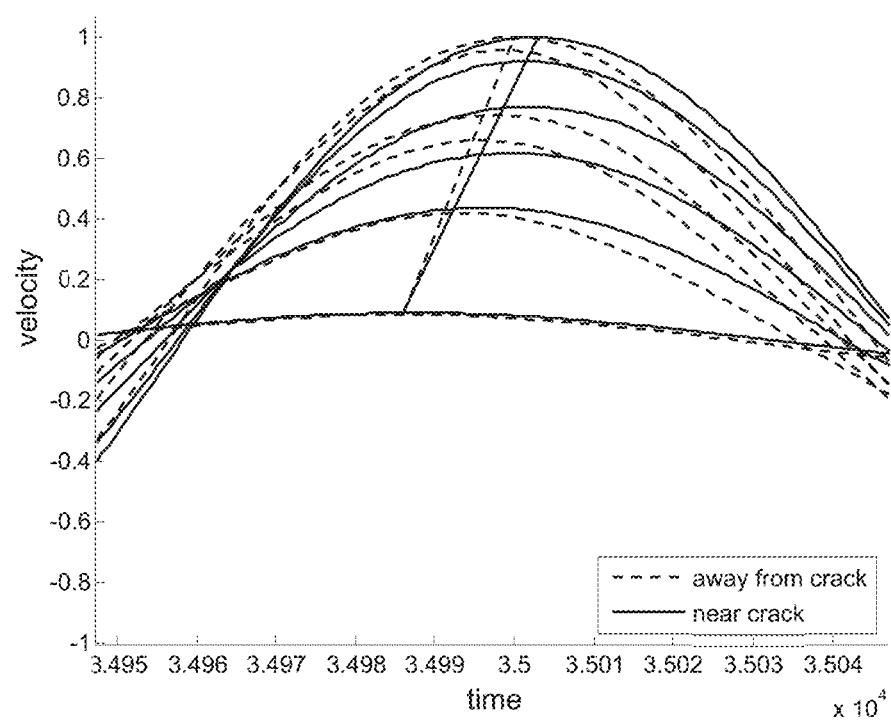
FIG. 17 illustrates example variations of nonlinearity near and away from a fracture.

FIG. 17 illustrates example variations of nonlinearity near and away from a fracture. FIG. 17 shows example variation of nonlinearity measured using time reversal on an open face formation, near and away from the fracture. The delay of arrival of the peak signal indicates a wave speed decrease (or modulus softening) and may be proportional to the nonlinear material parameter alpha. From the changes in the measured signal (e.g., change in size, wavelength, delay of arrival) as a function of the amplitude of vibration, value of nonlinear material parameter alpha may be calculated. Value of nonlinear material parameter alpha may be calculated from the slope of the lines. As shown in FIG. 17, nonlinearity of material increases closer to the fracture. Baseline nonlinear response may provide baseline shift, and the measured shifted may be compared with the baseline shift to determine formation of fracture in the material (more shifting when there is fracture/closer to the fracture).

In some implementations, characteristics of materials within the subsurface volume of interest may be determined based on the value(s) of the nonlinear material parameter(s) without measuring baseline value(s) of the nonlinear material parameter(s). Rather than separately measuring baseline values for materials in the subsurface volume of interest, information regarding the materials may be used to interpret the measured value(s) of the nonlinear material parameter(s). For example, information may be available on types and/or configuration of casing, rock, and/or concrete being probed. Such information may be used to determine the value(s) of nonlinear material parameter(s) that would be expected for the materials in different condition (e.g., value(s) expected without defect, value(s) expected with defect, value(s) expected with different types of defect, value(s) expected with defect in different locations). With knowledge on the type of casing used in the wellbore, concrete used in the wellbore, rock surrounding the wellbore, a single measurement of the value(s) of the nonlinear material parameter(s) may be taken to determine (estimate) the characteristics of materials (e.g., defect) within the subsurface volume of the wellbore.

In some implementations, the types of defects in the subsurface volume of interest may be determined based on the value(s) of the nonlinear material parameter(s) and/or other information. For example, determination of the integrity of the wellbore based on the value(s) of the nonlinear material parameter(s) may include determination of type(s) of defect in the subsurface volume of the wellbore based on the value(s) of the nonlinear material parameter(s). The value(s) of the nonlinear material parameter(s) may be used to distinguish between different types of defects in the subsurface volume of the wellbore. For example, different value(s) of the nonlinear material parameter(s) may correspond to different types of defect (e.g., microcracks, delamination, weakening of matrix, fractures) in different types of material (e.g., casing, concrete, rock, casing-concrete interface, concrete-rock interface), and the type of the defect may be determined based on the value(s) of the nonlinear material parameter(s) (e.g., specific value(s) of the nonlinear material parameter(s), certain amount of change between the value(s) and the baseline value(s), certain evolution of change from the baseline value(s) to the value(s).

In some implementations, the location of defects in the subsurface volume of interest may be determined based on the value(s) of the nonlinear material parameter(s) and/or other information. For example, determination of the integrity of the wellbore based on the value(s) of the nonlinear material parameter(s) may include determination of location(s) of defect in the subsurface volume of the wellbore based on the value(s) of the nonlinear material parameter(s). The value(s) of the nonlinear material parameter(s) may be used to perform spatial mapping of the subsurface volume of the wellbore to find locations of defects (e.g., weaker points in space according to the value(s) of the nonlinear material parameter(s))

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for determining wellbore integrity, the method comprising:
    transmitting a pulsed sinusoidal acoustic signal through a subsurface volume of a wellbore, the pulsed sinusoidal acoustic signal having a frequency;
    detecting the pulsed sinusoidal acoustic signal transmitted though the subsurface volume of the wellbore;
    transmitting, through the subsurface volume of the wellbore, a time-reversed acoustic signal of the pulsed sinusoidal acoustic signal, transmission of the time-reversed acoustic signal through the subsurface volume resulting in generation of focused acoustic signal in the subsurface volume of the wellbore;
    detecting the focused acoustic signal in the subsurface volume of the wellbore; and
    determining the integrity of the wellbore based on the focused acoustic signal in the subsurface volume of the wellbore, wherein the determining the integrity of the wellbore based on the focused acoustic signal in the subsurface volume of the wellbore includes determining values of nonlinear material parameters alpha, beta, and delta in the subsurface volume of the wellbore based on the focused acoustic signal, and comparing the values of the nonlinear material parameters alpha, beta, and delta with baseline values of the nonlinear material parameters alpha, beta, and delta, wherein the baseline values of the nonlinear material parameters alpha, beta, and delta are previously measured values of the nonlinear material parameters alpha, beta, and delta with known integrity of the wellbore, further wherein the nonlinear material parameter alpha relates to a strength of hysteresis and the nonlinear material parameters beta and delta relate to acoustoelasticity.

2. The method of claim 1, wherein the frequency of the pulsed sinusoidal acoustic signal determines a size of the subsurface volume of the wellbore that is probed, and the integrity of the wellbore is determined by increasing the size of the subsurface volume of the wellbore that is probed via one or more changes in the frequency of the pulsed sinusoidal acoustic signal, further wherein characteristics of subsurface materials determined by an initial probing of the subsurface volume of the wellbore with a smaller size of the probing is accounted for in a later probing of the subsurface volume of the wellbore with a larger size of the probing to determine characteristics of subsurface materials included in the larger size of the probing and not included in the smaller size of the probing.

3. The method of claim 1, wherein the nonlinear material parameters alpha, beta, and delta include higher-order elastic moduli.

4. The method of claim 1, where deviation of the values of the nonlinear material parameters alpha, beta, and delta from the baseline values of the nonlinear material parameters alpha, beta, and delta indicates formation of a defect in the subsurface volume of the wellbore.

5. The method of claim 4, wherein:
the subsurface volume of the wellbore includes casing, rock, and concrete between the casing and the rock; and
the defect in the subsurface volume of the wellbore includes a defect in the casing, a defect in the rock, a defect in the concrete, a defect at casing-concrete interface, and/or a defect at rock-concrete interface.

6. The method of claim 4, wherein an extent of the deviation of the values of the nonlinear material parameters alpha, beta, and delta from the baseline values of the nonlinear material parameters alpha, beta, and delta indicates an extent of the defect in the subsurface volume of the wellbore.

7. The method of claim 4, wherein a type of the defect in the subsurface volume of the wellbore is determined based on the comparison of the values of the nonlinear material parameters alpha, beta, and delta with the baseline values of the nonlinear material parameters alpha, beta, and delta.

8. The method of claim 4, wherein a location of the defect in the subsurface volume of the wellbore is determined based on the comparison of the values of the nonlinear material parameters alpha, beta, and delta with the baseline values of the nonlinear material parameters alpha, beta, and delta.

9. An apparatus that determines wellbore integrity, the apparatus comprising:
a first transceiver configured to transmit a pulsed sinusoidal acoustic signal through a subsurface volume of a wellbore, the pulsed sinusoidal acoustic signal having a frequency; and
a second transceiver configured to detect the pulsed sinusoidal acoustic signal transmitted though the subsurface volume of the wellbore;
wherein:
the second transceiver transmits, through the subsurface volume of the wellbore, a time-reversed acoustic signal of the pulsed sinusoidal acoustic signal, transmission of the time-reversed acoustic signal through the subsurface volume resulting in generation of focused acoustic signal in the subsurface volume of the wellbore;
the first transceiver detects the focused acoustic signal in the subsurface volume of the wellbore; and
the integrity of the wellbore is determined based on the focused acoustic signal in the subsurface volume of the wellbore, wherein determination of the integrity of the wellbore based on the focused acoustic signal in the subsurface volume of the wellbore includes determination of values of nonlinear material parameters alpha, beta, and delta in the subsurface volume of the wellbore based on the focused acoustic signal, and comparison of the values of the nonlinear material parameters alpha, beta, and delta with baseline values of the nonlinear material parameters alpha, beta, and delta, wherein the baseline values of the nonlinear material parameters alpha, beta, and delta are previously measured values of the nonlinear material parameters alpha, beta, and delta with known integrity of the wellbore, further wherein the nonlinear material parameter alpha relates to a strength of hysteresis and the nonlinear material parameters beta and delta relate to acoustoelasticity.

10. The system of claim 9, wherein the frequency of the pulsed sinusoidal acoustic signal determines a size of the subsurface volume of the wellbore that is probed, and the integrity of the wellbore is determined by increasing the size of the subsurface volume of the wellbore that is probed via one or more changes in the frequency of the pulsed sinusoidal acoustic signal, further wherein characteristics of subsurface materials determined by an initial probing of the subsurface volume of the wellbore with a smaller size of the probing is accounted for in a later probing of the subsurface volume of the wellbore with a larger size of the probing to determine characteristics of subsurface materials included in the larger size of the probing and not included in the smaller size of the probing.

11. The system of claim 9, wherein the nonlinear material parameters alpha, beta, and delta include higher-order elastic moduli.

12. The system of claim 9, where deviation of the values of the nonlinear material parameters alpha, beta, and delta from the baseline values of the nonlinear material parameters alpha, beta, and delta indicates formation of a defect in the subsurface volume of the wellbore.

13. The system of claim 12, wherein:
the subsurface volume of the wellbore includes casing, rock, and concrete between the casing and the rock; and
the defect in the subsurface volume of the wellbore includes a defect in the casing, a defect in the rock, a defect in the concrete, a defect at casing-concrete interface, and/or a defect at rock-concrete interface.

14. The system of claim 12, wherein an extent of the deviation of the values of the nonlinear material parameters alpha, beta, and delta from the baseline values of the nonlinear material parameters alpha, beta, and delta indicates an extent of the defect in the subsurface volume of the wellbore.

15. The system of claim 12, wherein a type of the defect in the subsurface volume of the wellbore is determined based on the comparison of the values of the nonlinear material parameters alpha, beta, and delta with the baseline values of the nonlinear material parameters alpha, beta, and delta.

16. The system of claim 12, wherein a location of the defect in the subsurface volume of the wellbore is determined based on the comparison of the values of the nonlinear material parameters alpha, beta, and delta with the baseline values of the nonlinear material parameters alpha, beta, and delta.

* * * * *